United States Patent
Pratt

(10) Patent No.: US 10,332,288 B1
(45) Date of Patent: Jun. 25, 2019

(54) HELICAL GRAPH

(71) Applicant: Patricia D. Pratt, Redondo Beach, CA (US)

(72) Inventor: Patricia D. Pratt, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 119 days.

(21) Appl. No.: 15/447,785

(22) Filed: Mar. 2, 2017

Related U.S. Application Data

(60) Provisional application No. 62/304,011, filed on Mar. 4, 2016.

(51) Int. Cl.
*G06T 11/20* (2006.01)
*G06T 19/00* (2011.01)

(52) U.S. Cl.
CPC ............ *G06T 11/206* (2013.01); *G06T 11/20* (2013.01); *G06T 19/00* (2013.01)

(58) Field of Classification Search
CPC ................................. G06T 19/00; G06T 11/20
See application file for complete search history.

(56) References Cited

U.S. PATENT DOCUMENTS

2015/0294275 A1* 10/2015 Richardson ............ G06T 19/00
705/7.18

* cited by examiner

*Primary Examiner* — Matthew Salvucci
(74) *Attorney, Agent, or Firm* — Tarolli, Sundheim, Covell & Tummino LLP

(57) ABSTRACT

A helical engine can convert a Cartesian data set that characterizes a Cartesian graph into a helical data set that characterizes a helical graph. The helical graph can include a helical shaped axis defining a given variable and deviations from the helical shaped axis that represent another variable.

18 Claims, 25 Drawing Sheets

HELICAL GRAPH

RELATED APPLICATIONS

The present application claims the benefit of priority to U.S. Provisional Application No. 62/304,011, filed on 4 Mar. 2016, the entirety of which is incorporated herein by reference.

TECHNICAL FIELD

The present disclosure relates generally to helical graphs. More particularly, the present disclosure relates to converting a Cartesian data set into a helical data set that characterizes a helical graph.

BACKGROUND

"Big data" is a term for data sets that are so large or complex that traditional data processing applications are inadequate. Challenges include analysis, capture, data curation, search, sharing, storage, transfer, visualization, querying and information privacy. The term "big data" often refers simply to the use of predictive analytics or certain other advanced methods to extract value from data, and seldom to a particular size of a data set. Accuracy in big data may lead to more confident decision making and better decisions can result in greater operational efficiency, cost reduction and reduced risk.

A Cartesian coordinate system is a coordinate system that specifies each point uniquely in a plane by a pair of numerical coordinates, which are signed distances to the point from two fixed perpendicular directed lines, measured in the same unit of length. Each reference line is called a coordinate axis or just axis of the system, and the point where they meet is its origin, usually at ordered pair (0, 0). The coordinates can also be defined as the positions of the perpendicular projections of the point onto the two axes, expressed as signed distances from the origin.

A helix is a type of smooth space curve, (e.g., a curve in three-dimensional space). A helix has the property that the tangent line at any point makes a constant angle with a fixed line called the axis. Examples of helices are coil springs and the handrails of spiral staircases. Helices can be either right-handed or left-handed. With the line of sight along the axis of the helix, if a clockwise screwing motion moves the helix away from the observer, then the helix can be referred to as a right-handed helix; if the clockwise screwing motion moves the helix towards the observer, the helix can be referred to as a left-handed helix. Handedness (or chirality) is a property of the helix rather than a property of the perspective of the helix.

SUMMARY

One example relates to a non-transitory machine readable medium having machine executable instructions. The machine executable instructions can include a helical engine that converts a Cartesian data set that characterizes a Cartesian graph into a helical data set that characterizes a helical graph. The helical graph can include a helical shaped axis defining a given variable and deviations from the helical shaped axis that represent another variable.

Another example relates to a system that can include a memory that stores machine readable instructions and a processing unit that accesses the memory and executes the machine readable instructions. The machine readable instructions can include a helical engine that receives a plurality of Cartesian data sets that each characterize a Cartesian graph with a given variable and another variable. The helical engine can include a helical history tool that converts each of the plurality of Cartesian data sets into a corresponding one of a plurality of helical data sets. Each helical data set characterizes a helical shaped axis that represent the given variable of the corresponding Cartesian data set and deviations from the helical shaped axis that represent the other variable of the corresponding Cartesian data set. The machine readable instructions can also include a graphical user interface that outputs a helical graph that represents each of the plurality of helical data sets.

Yet another example relates to a method that can include converting, by a computing device, a Cartesian data set into a helical data set. The helical graph can include a helical shaped axis defining a given variable and deviations from the helical shaped axis that represent another variable. The method can also include generating, by the computing device, a physical model file that characterizes a physical instantiation of the helical graph.

DETAILED DESCRIPTION

Figure 1:
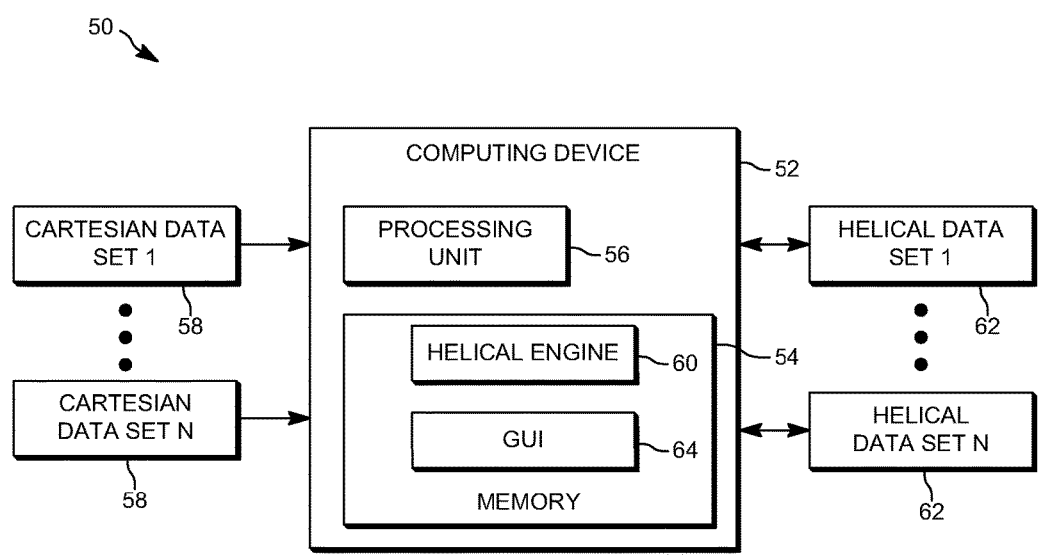
FIG. 1 illustrates an example of a system for generating a helical graph.

This disclosure relates to a system and method for converting a Cartesian data set that could represent a Cartesian coordinate graph into a helical data set characterizing a helical graph. In some examples, the helical data set can be converted into a data set (e.g., a file) that represents a physical object (e.g., a three-dimensional model) that can be analyzed and viewed with a structural analysis tool. Moreover, in some examples, a plurality of models of helical graphs can be arranged on a model of a multi-faceted structure (e.g., a geoid, a polyhedron, etc.). As explained herein, by viewing data on a helical graph, large amounts of data ("big data") can be quickly analyzed through visual inspection of the helical graph to reveal patterns, correlations, outliers, etc.

In particular, a helical history tool (HHT) can be employed to provide a three dimensional (3D) visualization tool that arranges lengthy and "big data" sets of multiple data fields in a spiral structure (a helical graph) that allows a viewer of the helical graph to see an entire "big data" set in one organized view that inherently, uniquely and systematically measures the correlative relationships (particularly periodicities) that may be unexpected. The output of the helical graph (e.g., via a graphical user interface) provides tunable parameters (e.g., user controls) that allow a twisting and shaping of the helical graph data structure to extract customized information which are inclusive in the HHT. In this manner, the helical graph becomes a virtual metrologic instrument that is employable to analyze multiple data sets simultaneously and correlatively over a sequential parameter such as a period of time, spatial beginning and end (e.g., flight path), frequency, electromagnetic spectrum, etc. This creates a representation of the data over any time, frequency or spatial period. Once in a structural helical configuration and applied parameters are selected, the data is then viewed in user-specified configurations which can be implemented through algorithmic solutions, User Interfaces (UIs) or virtual embedded instantiations of the results.

Additionally, a model generator (which can also be referred to as a Helical History Fly-Thru Tool (HHFT)) can transform a helical graph generated by the HHT into data representing a physically navigable intelligent visualization (a physical object) combining the power of two distinct kinds of software capabilities into an analytical competence turning discrete data points into a 3D structure in physical space. The model generator can generate a physical model file that can be accessed by a structural analysis application (e.g., a software tool) that provides a common structure to a computational instantiation of a comprehensive data set. In this manner, bits of data become a structural representation of a helix (and/or a spiral) which can then be intuitively analyzed with a structural analysis application. Accordingly, the model generator can convert the helical graph into a system of data.

In this manner, by employing a GUI, perspective and orthogonal viewing of the various parameters on the same helical graph enables enumerable applications and deductive processes that reveal information buried in data. With the data transformed into a (virtual/simulated) physical helix structure, the information contained within the helix is held "live" to allow the structural analysis application to track and trace to each data point as desired by the user of the GUI.

Additionally, in some examples, a helix plotter can be included to position multiple instances of the graphs representing physical structures on another representation of a physical structure represented as a base such as a slab or geoid. Moreover, the use of multiple helixes (or spirals) on a single base structure allows for yet another visualization tool that can be employed to extrapolate information in "big data" sets.

FIG. 1 illustrates an example of a system 50 for generating a helical graph. The system 50 can include a computing device 52. The computing device 52 can be implemented as a general purpose computer, such as a laptop or workstation, a server, a mobile device (e.g., a table computer, a smartphone), etc. The computing device 52 can include memory 54 for storing machine readable instructions. The memory 54 can be implemented, for example, as volatile memory (e.g., random access memory (RAM), non-volatile memory (e.g., a solid state drive, a hard disk drive, flash memory, etc.) or a combination thereof. The computing device 52 can also include a processing unit 56 (e.g., one or more processor cores) for accessing the memory 54 and executing the machine readable instructions. In some examples, the computing device 52 can operate on a computing cloud. In such a situation, features of the computing device 52, such as the processing unit 56 and/or the memory 54, could be representative of a single instance of hardware or multiple instances of hardware with applications executing across the multiple of instances (i.e., distributed) of hardware (e.g., computers, routers, memory, processors, or a combination thereof). Alternatively, the computing device 52 could be implemented on a single end-user device.

The computing device 52 can receive N number of Cartesian data sets 58, wherein N is an integer greater than or equal to one. Each Cartesian data set 58 can be implemented as a data structure (e.g., an array, a matrix, a linked list, a record, a graph, etc.) that represents an abstract data type (ADT). Each Cartesian data set 58 set can represent, for example, data describing the physical or virtual world. The N number of Cartesian data sets 58 can represent a "big data" set. For instance, in a first example, each Cartesian data set 58 can represent temperature plotted as a function of time measured at a specific region of the earth. The data represented in each Cartesian data set 58 can be continuous (e.g., representing a line) or discrete (e.g., representing a scatter graph). Moreover, in the first example, each Cartesian data set 58 can represent a plurality of individual plots of temperature as a function of time measured at different regions on the earth. In a second example each Cartesian data set 58 can represent backscatter for an energy band (or multiple energy bands) plotted as a function of time.

In other situations, each Cartesian data set 58 can represent disparate data. For instance, in a third example, a first Cartesian data set 58 (e.g., the Cartesian data set 1) can represent a mean planet temperature plotted as a function of time and a second Cartesian data set 58 (e.g., Cartesian data set 2) can represent a planet radius plotted as a function of time. One of ordinary skill in the art will recognize that the Cartesian data set 58 can represent nearly any measured or determined relationship that can be represented on a Cartesian graph.

Figure 2:
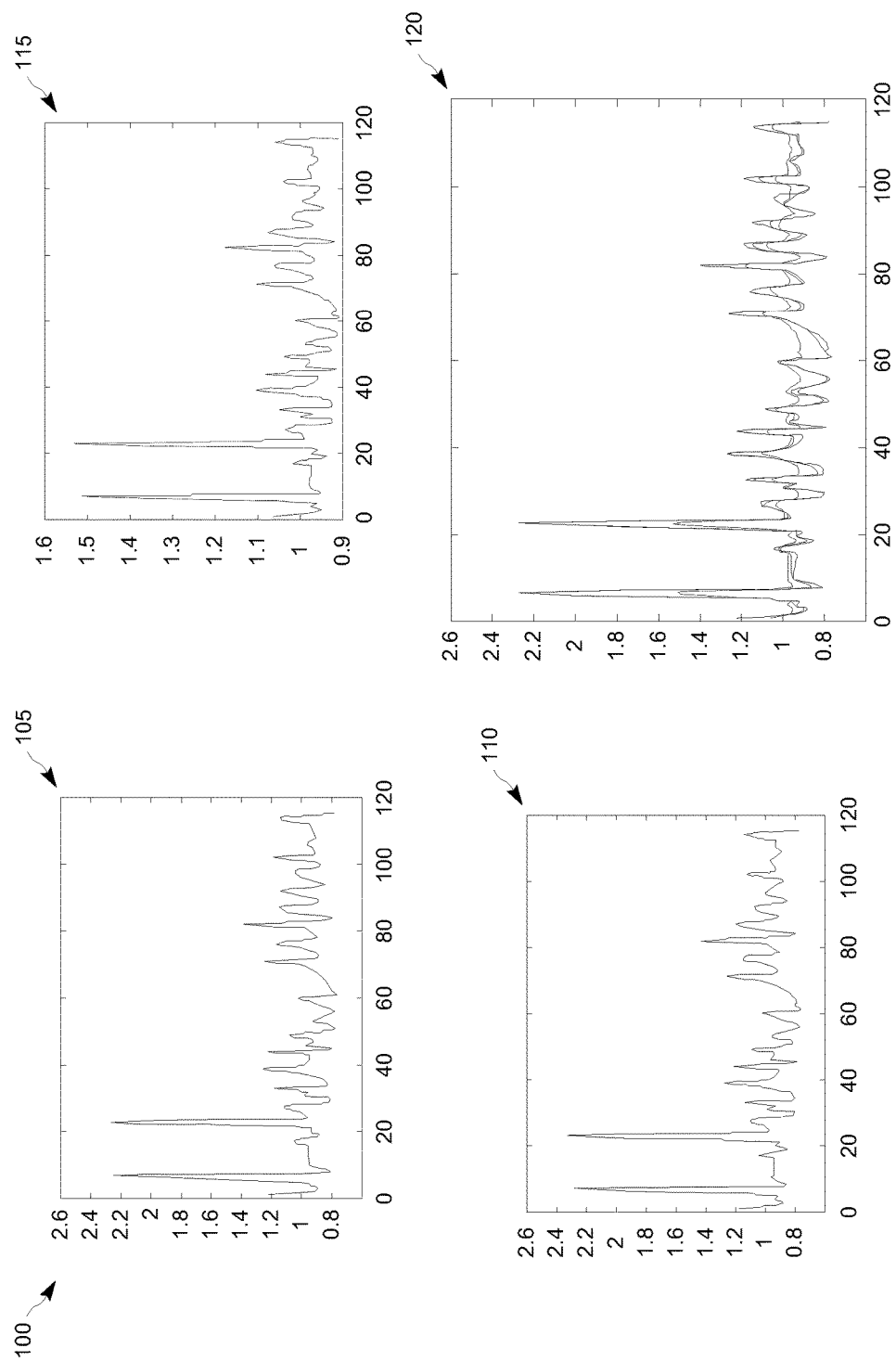
FIG. 2 illustrates examples of Cartesian graphs.

FIG. 2 illustrates an example of Cartesian graphs 100 that could be represented by the N number of Cartesian data sets 58. The Cartesian graphs 100 includes Cartesian graphs 105, 110 and 115 that each plot a single dependent variable (e.g., temperature or backscattering) as a function of a common (e.g., universal) independent variable (e.g., time). Additionally, a combination Cartesian graph 120 illustrates a combination of each line on the Cartesian graphs 105, 110 and 115 plotted on the same plane.

Referring back to FIG. 1, the memory 54 can include a helical engine 60. The helical engine 60 can be implemented as machine readable instructions (e.g., a software application) that executes on the computing device 52. The helical engine 60 can be programmed/configured to convert each of the N number of Cartesian data sets 58 into a corresponding N number of helical data sets 62. Each of the N number of helical data sets 62 can represent a helical shaped graph, such that there are N number of helical shaped graphs. Each of the N number of helical shaped graphs can have a common independent variable (e.g., a universal variable). Additionally, each of the N number of helical shaped graphs can have a dependent variable. The universal variable (e.g., time) changes as a function of height on each helix, and local height variations of each helical turn (e.g., spiral) indicate a value (magnitude and polarity) of the dependent variables. In this manner, each of the helical shaped graphs (or some subset thereof) can be combined and plotted on a single helical graph in a manner described herein.

The memory 54 can also include a graphical user interface (GUI) 64 that can output a visual depiction of the N number of helical data sets 62 or some subset thereof. The GUI 64 can be employed to manipulate (e.g., stretch, contract and/or rotate) the helical graphs depicting the helical data sets 62.

Figure 3:
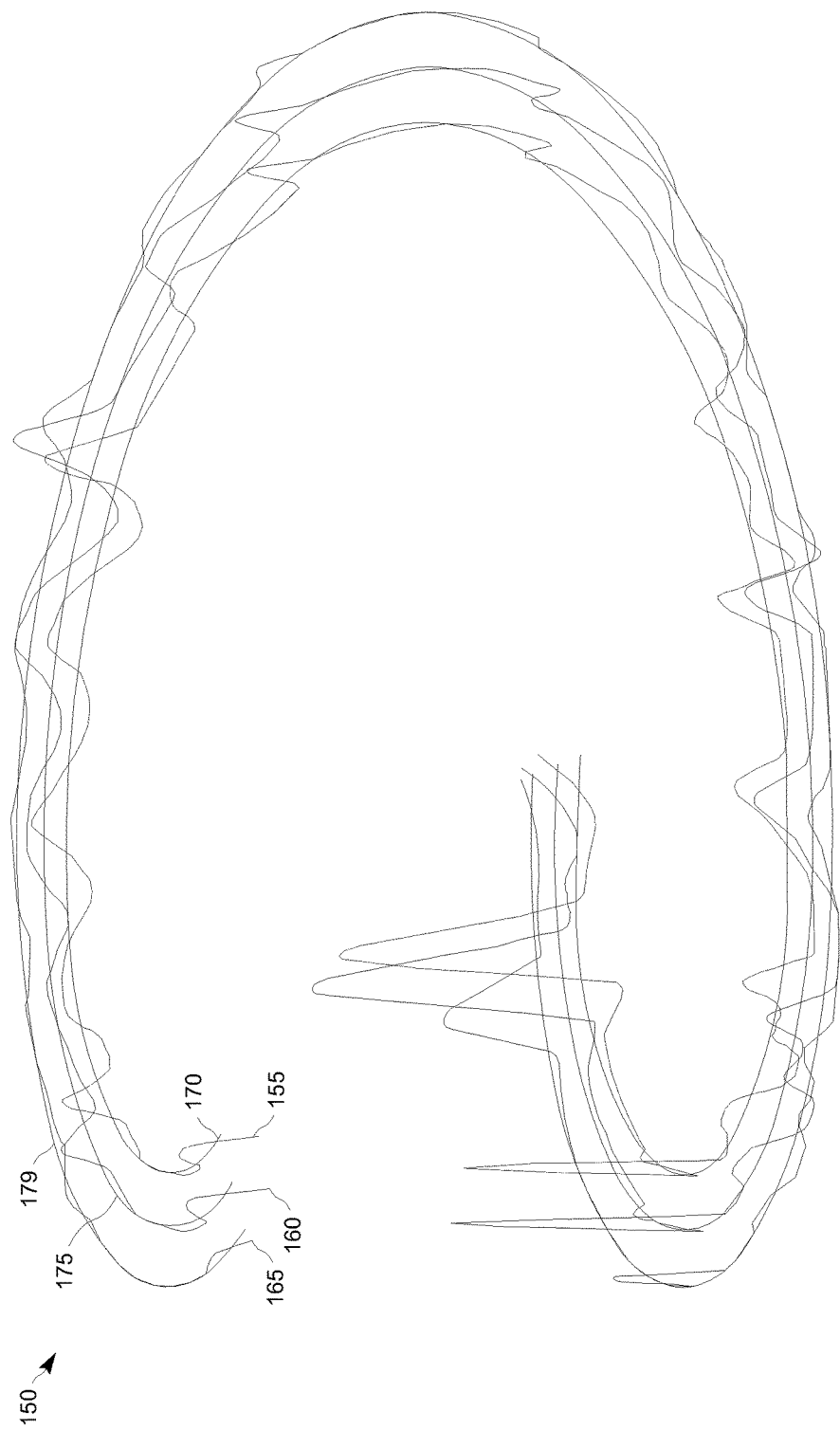
FIG. 3 illustrates an example of a helical graph.

FIG. 3 illustrates an example of a helical graph 150 that can be represented by the N number of helical data sets 62 and output by the GUI 64. The helical graph 150 includes three helical plots 155, 160 and 165 that correspond to the plots on the Cartesian graphs 105, 110 and 115, respectively of FIG. 2. As is illustrated in FIG. 3, the helical graph 150 visually indicates correspondence between the values of the dependent variables on the helical plots 155, 160 and 165 more clearly than any of the plots on the Cartesian graphs 105, 110 and 115 or the combination Cartesian graph 120 of FIG. 2. The helical graph 150 also includes plots of axes 170, 175 and 179 for reference to characterize the magnitude of the dependent variables of helical plots 155, 160 and 165 for a given point along each helix.

Referring back to FIG. 1, by converting the N number of Cartesian data sets 58 into the helical data sets 62 and outputting the resulting (three-dimensional) N number of helices characterized by the helical data sets 62, a viewer of the data (e.g., an end-user) can quickly identify patterns and/or points of interest in data sets that are obfuscated with two-dimensional graphs. Moreover, the helical graphs provide improved area efficiency, thereby (in some examples) allowing a higher resolution of data within the same screen real-estate as a Cartesian graph.

Figure 4:
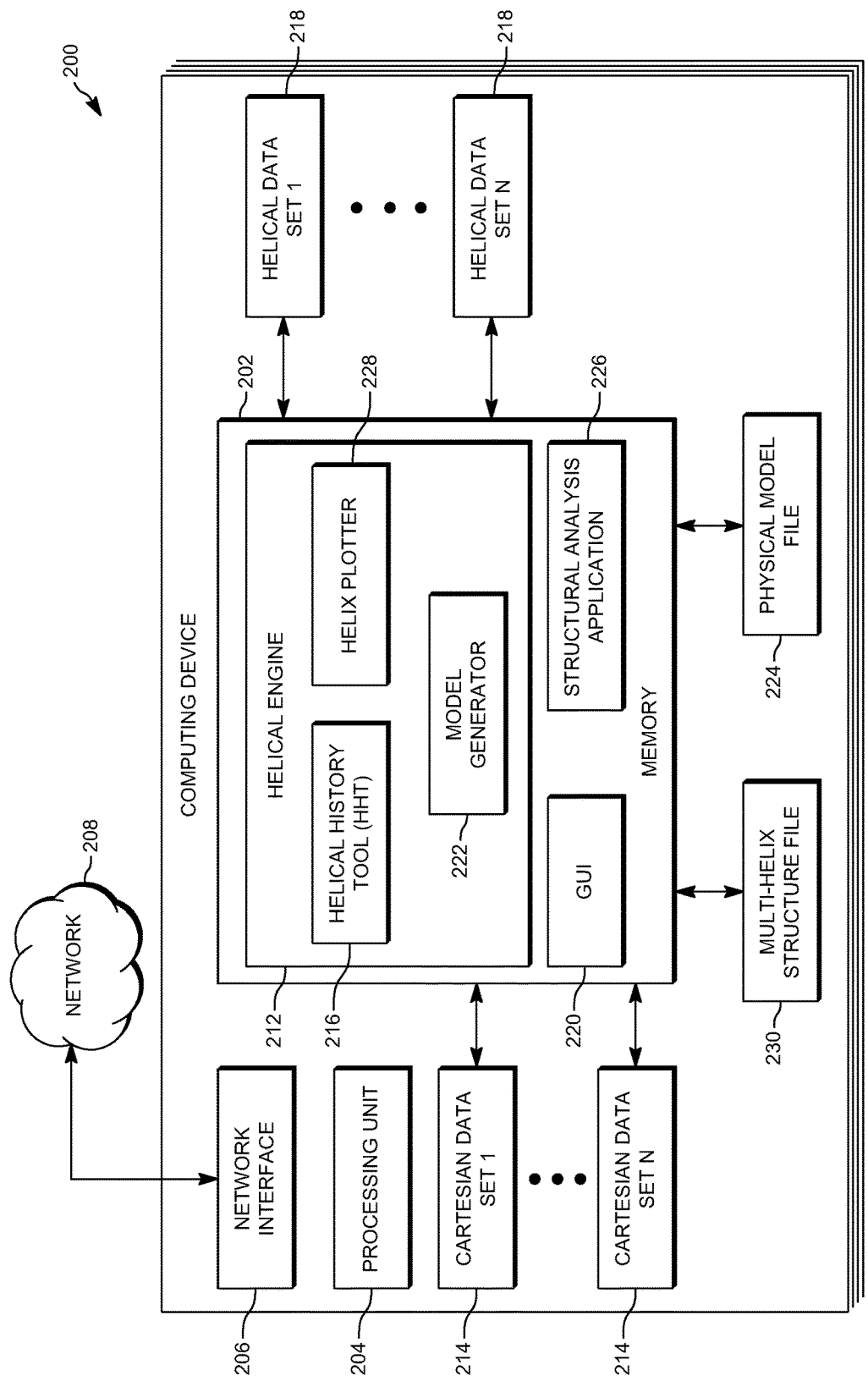
FIG. 4 illustrates an example of a computing device for generating a helical graph.

FIG. 4 illustrates an example of a computing device 200 that can generate a helical graph. The computing device 200 can be employed, for example, to implement the computing device 52 of FIG. 1. The computing device 200 can include a memory 202 that can store machine readable instructions. The memory 202 could be implemented, for example, as non-transitory computer readable media, such as volatile memory (e.g., random access memory), nonvolatile memory (e.g., a hard disk drive, a solid state drive, flash memory, etc.) or a combination thereof. The computing device 200 can also include a processing unit 204 to access the memory 202 and execute the machine-readable instructions. The processing unit 204 can include, for example, one or more processor cores. The computing device 200 can include a network interface 206 configured to communicate with a network 208. The network interface 206 could be implemented, for example, as a network interface card. The network 208 could be implemented for example, as a public network (e.g., the Internet), a private network (e.g., a carrier network) or a combination thereof.

The computing device 200 could be implemented, for example in a computing cloud. In such a situation, features of the computing device 200, such as the processing unit 204, the network interface 206, and the memory 202 could be representative of a single instance of hardware or multiple instances of hardware with applications executing across the multiple of instances (i.e., distributed) of hardware (e.g., computers, routers, memory, processors, or a combination thereof). Alternatively, the computing device 200 could be implemented on a single dedicated server.

The memory 202 can include a helical engine 212. The helical engine 212 can receive N number of Cartesian data sets 214. In some examples, the N number of Cartesian data sets 214 (or some subset thereof) can be provided from an external device (e.g., a database or another computing device) via the network 208. In other examples, the N number of Cartesian data sets 214 (or some subset thereof) can be generated locally (e.g., in response to user input). In still other examples, the N number of Cartesian data sets 214 (or some subset thereof) can be provided from a system attached to the computing device 200 (e.g., a sensor).

Each Cartesian data set 214 can be implemented as a data structure (e.g., an array, a matrix, a linked list, a record, a graph, etc.) that represents an ADT. Each Cartesian data set 214 set can represent, for example, data describing the physical or virtual world. In some examples, the N number of Cartesian data sets 58 can represent a "big data" set. For instance, in the first example explained with respect to FIG. 1, each Cartesian data set 214 can represent temperature plotted as a function of time measured at a specific region of the earth. The data represented in each Cartesian data set 214 can be continuous (e.g., representing a line) or discrete (e.g., representing a scatter graph). Moreover, in such a situation, each Cartesian data set 214 can represent a plurality of individual plots of temperature as a function of time measured at different regions on the earth. In a second example, as described with respect to FIG. 1, each Cartesian data set 214 can represent backscattering for an energy band (or multiple energy bands) plotted as a function of time.

In other situations, each Cartesian data set 214 can represent disparate data. For instance, in a third example, as described with respect to FIG. 1, a first Cartesian data set 214 (e.g., Cartesian data set 1) can represent a mean planet temperature plotted as a function of time and a second Cartesian data set 214 (e.g., Cartesian data set 2) can represent a planet radius plotted as a function of time. One of ordinary skill in the art will recognize that the Cartesian data set 214 can represent nearly any measured or determined relationship that can be represented on a Cartesian graph.

Figure 5:
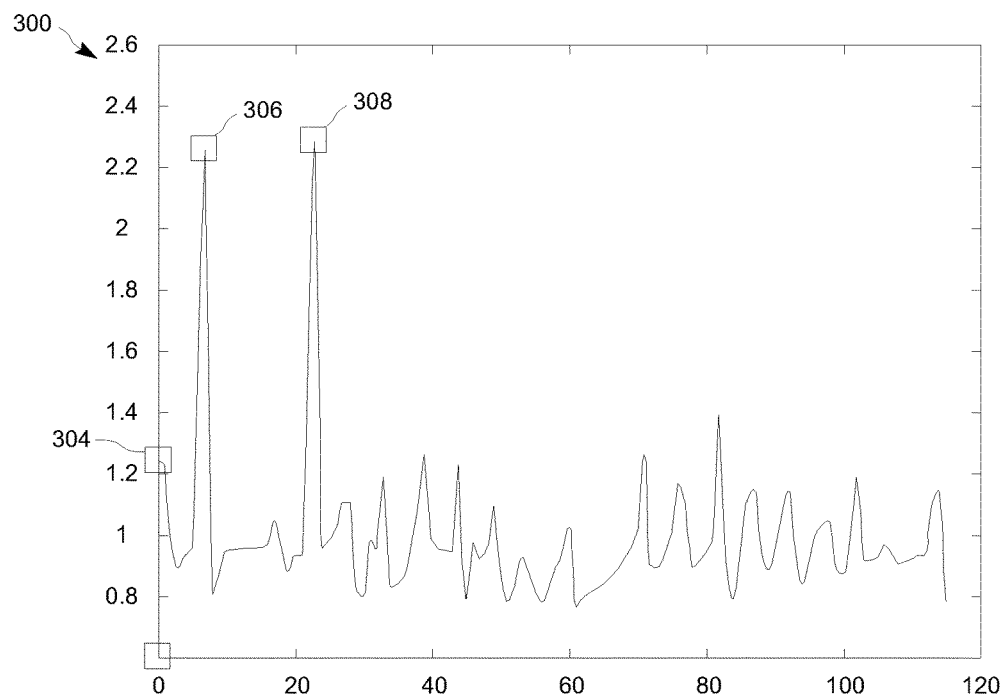
FIG. 5 illustrates an example of a Cartesian graph.

FIG. 5 illustrates an example of a Cartesian graph 300 that could be employed to represent a given Cartesian data set 214 of FIG. 4 (e.g., the first Cartesian data set 214). In some examples, the Cartesian graph 300 could be representative of a "smoothing" of discrete data. In other examples, the Cartesian graph 300 could be representative of a continuous function defined by a Cartesian data set.

The Cartesian graph 300 includes values plotted in an X-Y plane. In particular, a Y-intercept near point (0,1.25) of the Cartesian graph 300 is denoted with reference number 304. Moreover, a first peak 306 is positioned near point (8, 2.5). Additionally, a maximum (and second peak) 308 is positioned near point (23, 2.3).

Referring back to FIG. 4, the helical engine 212 can include a helical history tool (HHT) 216. The HHT 216 can be programmed/configured to convert each of the N number of Cartesian data sets 214 into a corresponding N number of helical data sets 218. Each of the N number of helical data sets 218 can represent a helical shaped graph, such that there are N number of helical shaped graphs. Each of the N number of helical shaped graphs can have a common independent variable (e.g., a universal variable). Additionally, each of the N number of helical shaped graphs can have a dependent variable. The universal variable (e.g., time) changes as a function of height on each helix, and local height variations of each helical turn (e.g., spiral) indicate a value (magnitude and polarity) of the dependent variables. In this manner, each of the helical shaped graphs (or some subset thereof) can be combined and plotted on a single helical graph in a manner described herein.

Figure 6:
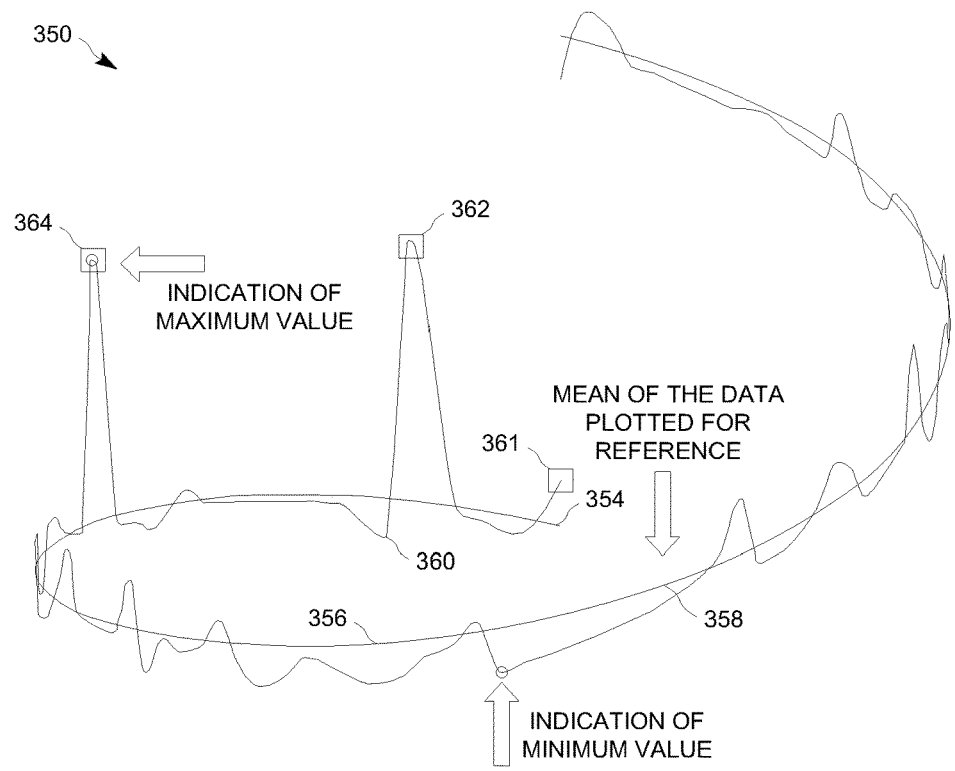
FIG. 6 illustrates an example of a helical graph.

FIG. 6 illustrates an example of a helical graph 350 that could be generated from a given helical data set 218 of FIG. 4 (e.g., the first helical data set). The helical graph 350 corresponds to the Cartesian graph 300 of FIG. 5. That is, the helical graph 350 represents the Cartesian graph 300 converted into a helical graph.

To generate the helical data set 218, the HHT 216 can determine a mean value of a dependent variable characterized in the given Cartesian data set 214. The HHT 216 can set a height for the helix. The height of the helix can be adjusted, for example, in response to user input and/or configuration parameters. The HHT 216 can also set a number of turns (rotations) within the helix for the determined height. In examples where the given Cartesian data set 214 has a periodicity (e.g., where the Cartesian data set represents a repeating wave), each turn (rotation) can correspond to a period of the given Cartesian data set 214. Additionally, a radius change (if any) for the helix can be determined. In some examples, the radius can increase or decrease from an origin of the helix to provide a "cone" appearance for the helix. In other examples, the radius can be constant throughout the helix to provide a "spring" appearance for the helix.

Additionally, the number of data points in the given Cartesian data set 214 can correspond to a discrete vertical (Z plane) increase in the helix. As one example, in a situation where the height of the helix is set to 10 units, and there are 100 data points in the given Cartesian data set 214, each data point (after the origin data point) for the helix can be positioned 0.1 units in a vertical (Z plane) coordinate greater than a previous data point.

Collectively, the determined mean, height, the number of rotations the determined radius change (if any) and a number of data points in the given Cartesian data set 214 defines a scale of the helix. The scale can be employed to determine an axis (representing a universal or independent variable), which can be referred to as the "H-axis") 356. The H-axis 356 is plotted as the mean value of the given Cartesian data set 214 in a shape defined by the scale of the helix. At each point of interest the along the H-axis 356, the HHT 216 can calculate a gradient (e.g., a three-dimensional derivative) of the H-axis 356 to determine a slope of a tangent line for each point of interest. For (each) given point of interest (given point), the dependent variable can correspond to a vector/ line with a height corresponding to a magnitude (relative to the mean) of the dependent variable at the given point, wherein the line is perpendicular to the slope of the tangent line at the given point on the H-axis 356 of the helical graph 350.

Additionally, each data point along the H-axis 356 can correspond to polar coordinates on the helix. For instance, in a situation where the circumference of a turn (rotation) of the helix is $2\pi$ (2 pi) radians and there are 2 rotations and a height of 10 units, and there are 100 data points, the origin of the H-axis 356 (shown at reference number 354) corresponds to a an origin (e.g., point (0,0)) of the given Cartesian data set 214 (e.g., point (0,0) of the Cartesian graph 300 of FIG. 5). Moreover, a point at $(0, 2\pi)$ on the H-axis 356, shown at reference number 358 may correspond to a point at in the Cartesian data set 214 that is at the beginning of a second period. Alternatively, the point at 358 may be matched to a corresponding point (e.g., point $(0, 2\pi)$) of the Cartesian graph 300. Alternatively, the radius and curl of the H-axis 356 may be adjusted (scaled) such that a different point on the Cartesian graph 300 corresponds to nearly any point on the Cartesian graph 300.

To generate the given helical data set 218, the HHT 216 can convert a magnitude of each point in the given Cartesian data set 214 into a relative magnitude above the mean of the Cartesian data set 214, and in some examples, each point in the given helical data set 218 can be normalized. Thus, in a situation where a first data point for the given helical data set 218 is four times (4×) the mean, the first data point may have a magnitude that is double that of a second data point for the given helical data set 218 that is two times (2×) the mean. The points in the given helical data set 218 can be plotted as a helical graph line 360.

As illustrated by the helical graph 350, the data values along the helical graph line 360 vary in a manner corresponding to the Cartesian graph 300. For instance, the magnitude of the helical graph line 360 at the origin 354, denoted as a reference number 361 corresponds to the magnitude of the dependent variable (the Y value) of the Cartesian graph 300 at the Y-intercept 304. Additionally, the first peak 306 in the Cartesian graph 300 corresponds to a first peak 362 on the helical graph line 360. Similarly, the maximum at the Cartesian graph 300 at the point 308 corresponds to a maximum (a second peak) at a point 364 on the helical graph 350.

Furthermore, Appendix A of U.S. Provisional Patent No. 62/304,011, which is incorporated herein by reference includes an example of computer code (e.g., machine readable instructions) for converting the N number of Cartesian data sets 214 to the corresponding N number of helical data sets 218.

Referring back to FIG. 4, by employing the process described with respect to FIGS. 5 and 6, the HHT 216 can convert each of the N number of Cartesian data sets 214 into corresponding helical data sets 218. In some examples, a subset of the N number of the helical data sets 218 can be normalized together, such that each of the subset of the N number of helical data sets 218 can be plotted on a common H-axis to represent a universal (independent variable) that is common among each of the subset of the N number of helical data sets 218.

Additionally, the memory 202 can include a graphical user interface (GUI) 220 that can output a helical graph (a visual representation) of each of the N number of helical data sets 218. In some examples, the output can be on a local computer display. In other examples, the GUI 220 can communicate with a remote client (e.g., an application) executing on a mobile device (e.g., a smartphone or tablet computer) to output the helical graph.

As one example, the GUI 220 can output a visual representation of the helical graph 350 illustrated in FIG. 6. In some examples, the GUI 220 can also output a corresponding Cartesian graph concurrently. Thus, in some examples, the GUI 220 can output the Cartesian graph 300 and the helical graph 350 concurrently so that a user can compare and contrast the two graphs.

Alternatively, the GUI 220 can output a (combination) helical graph that corresponds to two or more of the N number of helical data sets 218 with a universal (independent) variable to represent a common H-axis. In such a situation, each H-axis can be skewed/scaled slightly to allow for parallel placement. For example, the in a situation where the N Cartesian data sets 214 correspond to the Cartesian graphs 105, 110 and 115 of FIG. 2, the HHT 216 can generate three (3) corresponding helical data sets 218. Thus, the GUI 220 can output the helical graph 150 as illustrated in FIG. 3, with helical plots 155, 160 and 165 that represent the Cartesian graphs 105, 110 and 115, respectively illustrated in FIG. 2. Alternatively, each of the helical data sets 218 can overlay each other on the same H-axis.

Figure 7:
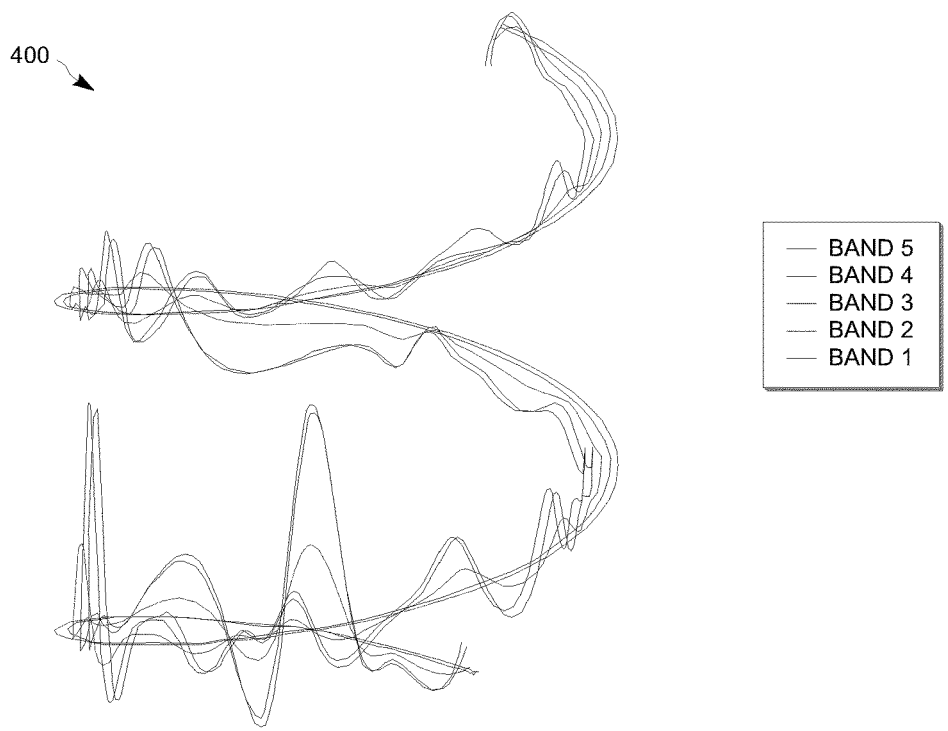
FIG. 7 illustrates another example of a helical graph.
Figure 8:
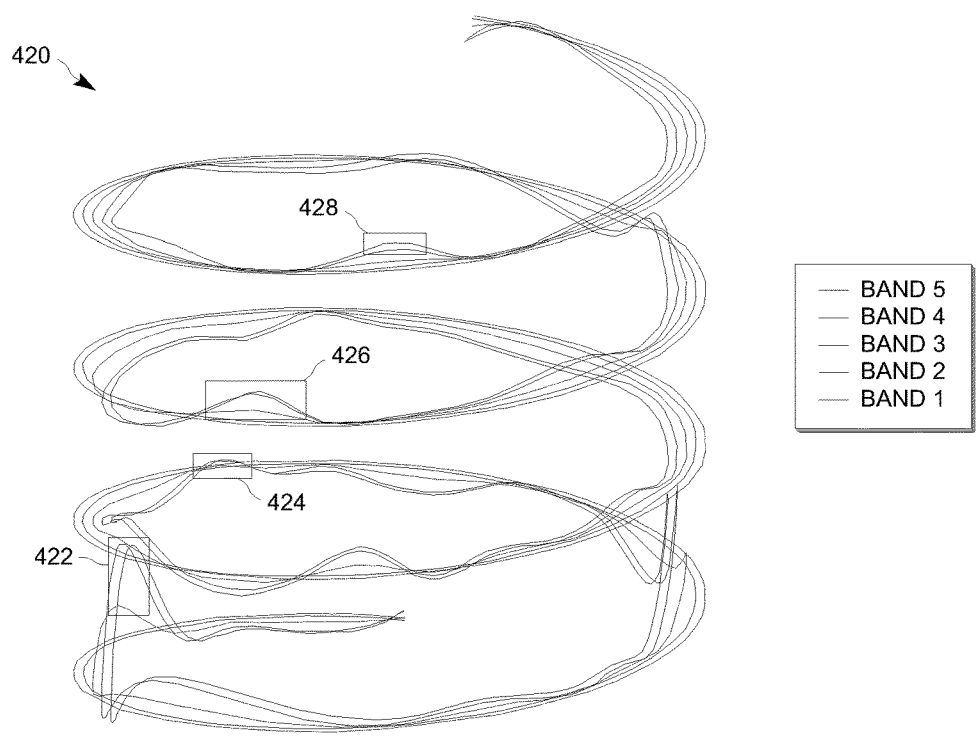
FIG. 8 illustrates the helical graph illustrated in FIG. 7 at a different scale.

The GUI 220 can provide controls (e.g., user controls), such as radio buttons (e.g., virtual buttons) and/or sliders for changing a scale of the H-axis for the universal (independent) variable in the helical graph output. For example, in a situation where five (5) of the helical graphs represent a backscattering of waves in different energy bands, the GUI 220 might output a helical graph, such as the helical graph 400 illustrated in FIG. 7. Moreover, a user viewing an output of the GUI 220 can manipulate the controls to change the scaling of the helical graph that might result in a helical graph such as the helical graph 420 of FIG. 8. As illustrated in the helical graph 420, outliers (of data), such as those at reference points 422, 424, 426 and 428 can be quickly ascertained by a viewer of the helical graph 420.

Figure 9:
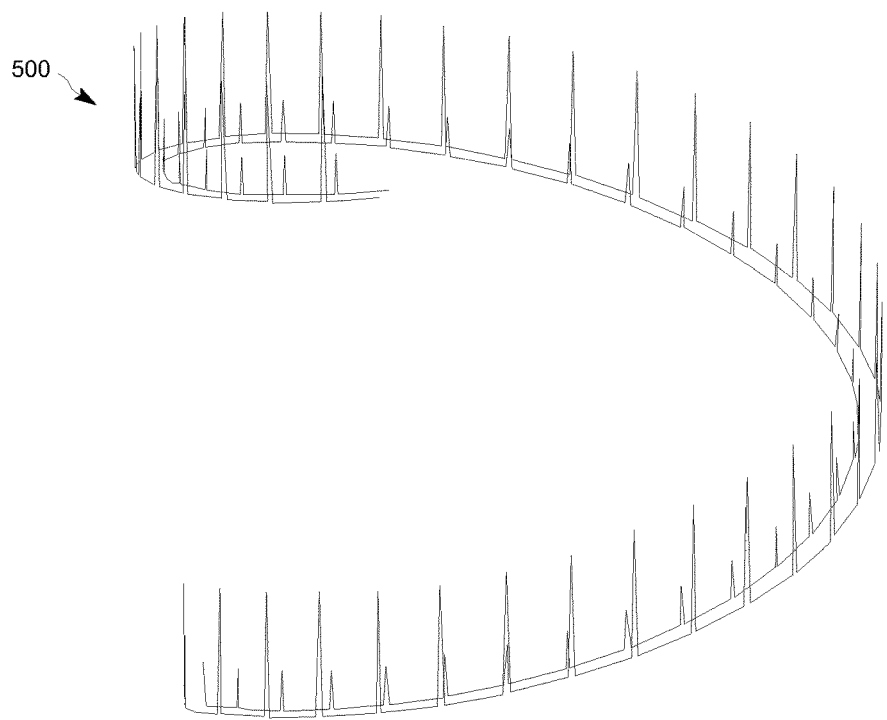
FIG. 9 illustrates yet another example of a helical graph.
Figure 10:
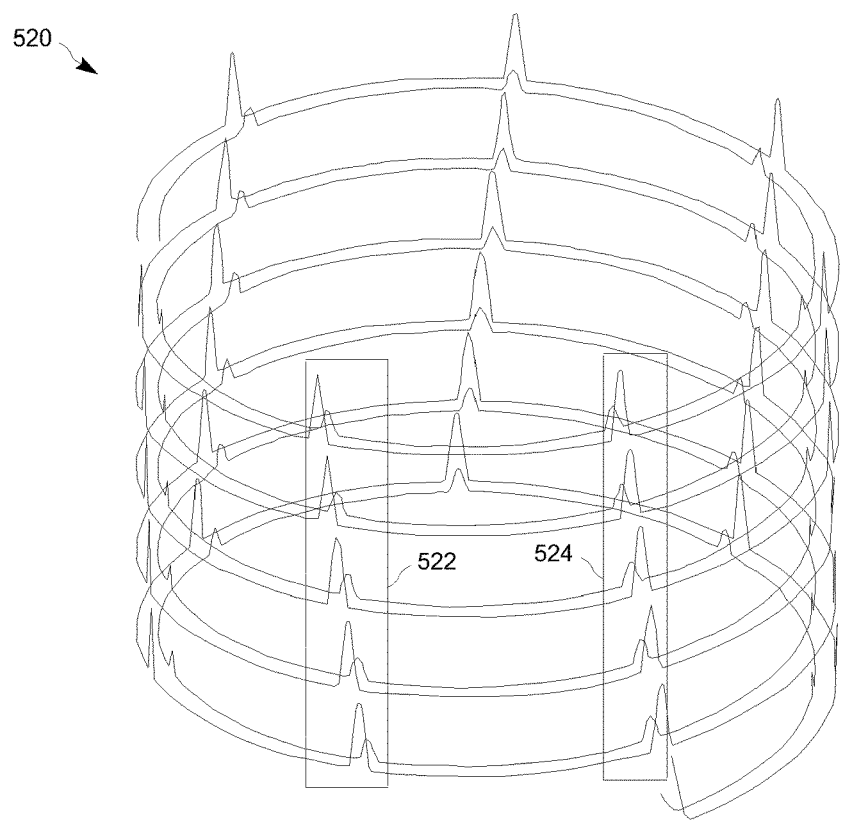
FIG. 10 illustrates the helical graph of FIG. 9 at a different scale.

Similarly, patterns (e.g., periodicity) can also by quickly ascertained by viewing the helical graph 420. For instance, in one example, the two (2) instances of the helical data set 218 forms a helical graph that can be output by the GUI 220 corresponding to the helical graph 500 illustrated in FIG. 9. In such a situation, the viewer of the graph 500 could use the controls provided by the GUI 220 to change a scaling of the graph 500 to generate a graph, such as the graph 520 illustrated in FIG. 10. As illustrated in FIG. 10, repeated peaks, such as those in reference numbers 522 and 524 can be quickly ascertained to identify a periodicity and/or other patterns in the helical data sets 218.

Referring back to FIG. 4, the GUI 220 can provide options for changing an orientation and/or rotating the outputted helical graph. In this manner, a viewer can "zoom" into a specific area of the helical graph, view the helical graph from a different orientation (e.g., a vertical or horizontal orientation) and/or rotate the helical graph to further facilitate understanding of the helical data sets 218.

Figure 11:
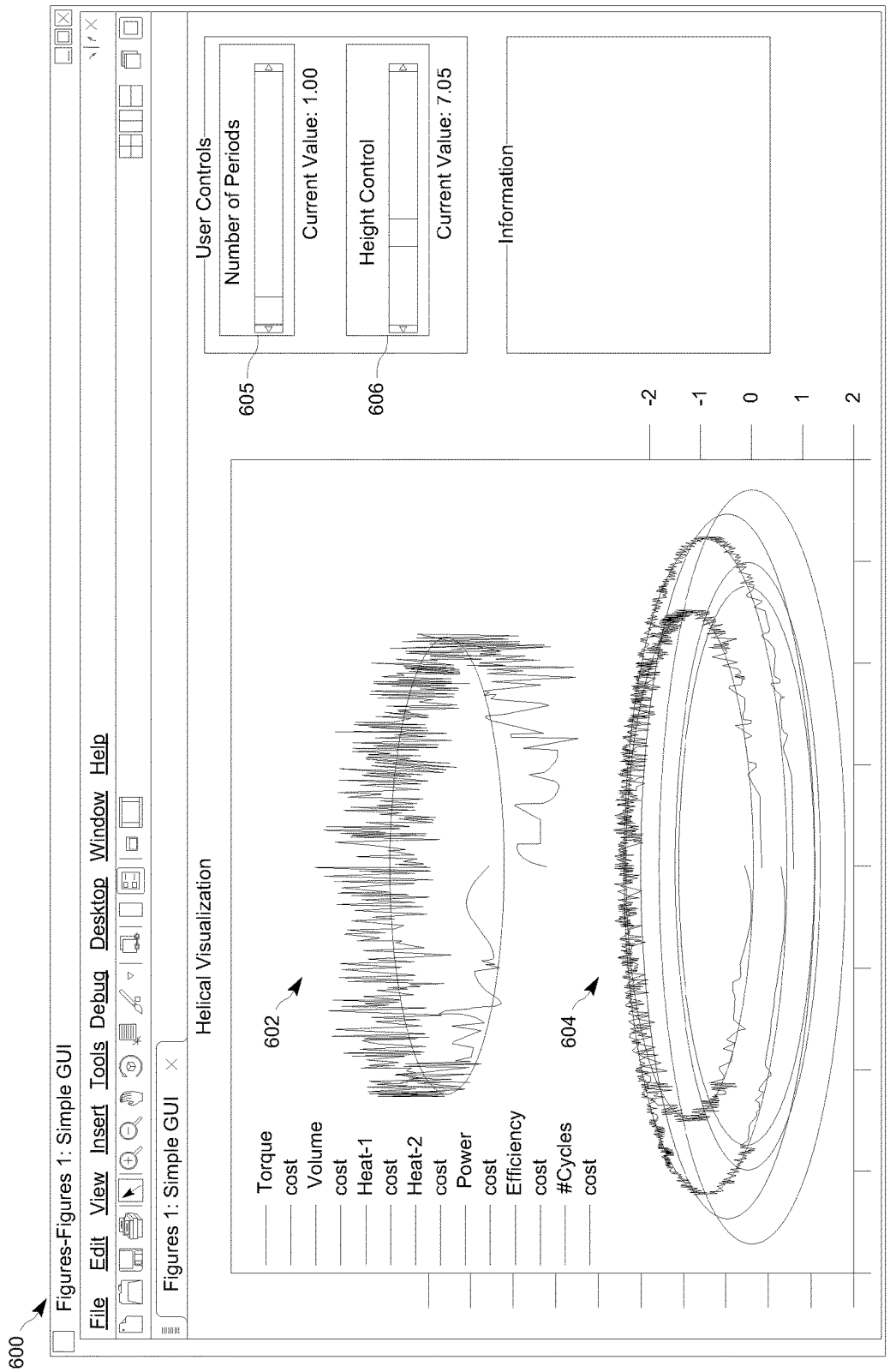
FIG. 11 illustrates a screenshot of helical graphs.

Still further, the GUI 220 can include controls (e.g., user controls) to adjust a normalization of the helical data sets 218. For example, FIGS. 11-14 illustrate examples of screenshots provided by the GUI 220 that represent examples of the helical data sets 218 (e.g. the N number of helical data sets 218). In particular, FIG. 11 illustrates a screenshot 600 that outputs helical graphs 602 and 604. The helical graph 602 plotted characterizes a helical data set 218 without normalization (for one period), which results in a "ring of data". In the helical graph 604, the helical data set 218 is normalized for one period. In the helical graphs 602 and 604, the "rings" are helices that are scaled to create an appearance of being "flattened" due to a loss of helix height. This "flattening" can provide a user (a viewer) viewable data on different scales. In some examples, user controls can allow the user to select options of specific data sets to plot together. Additionally or alternatively, the user controls may allow the user to purposely scale another data set by an amount that will allow both to be viewed in detail on the same order on one helical axis. The GUI 622 can include a period slider 605 for controlling a total number of periods output by each helix and/or a height slider 606 for controlling a height of each helix output.

Figure 12:
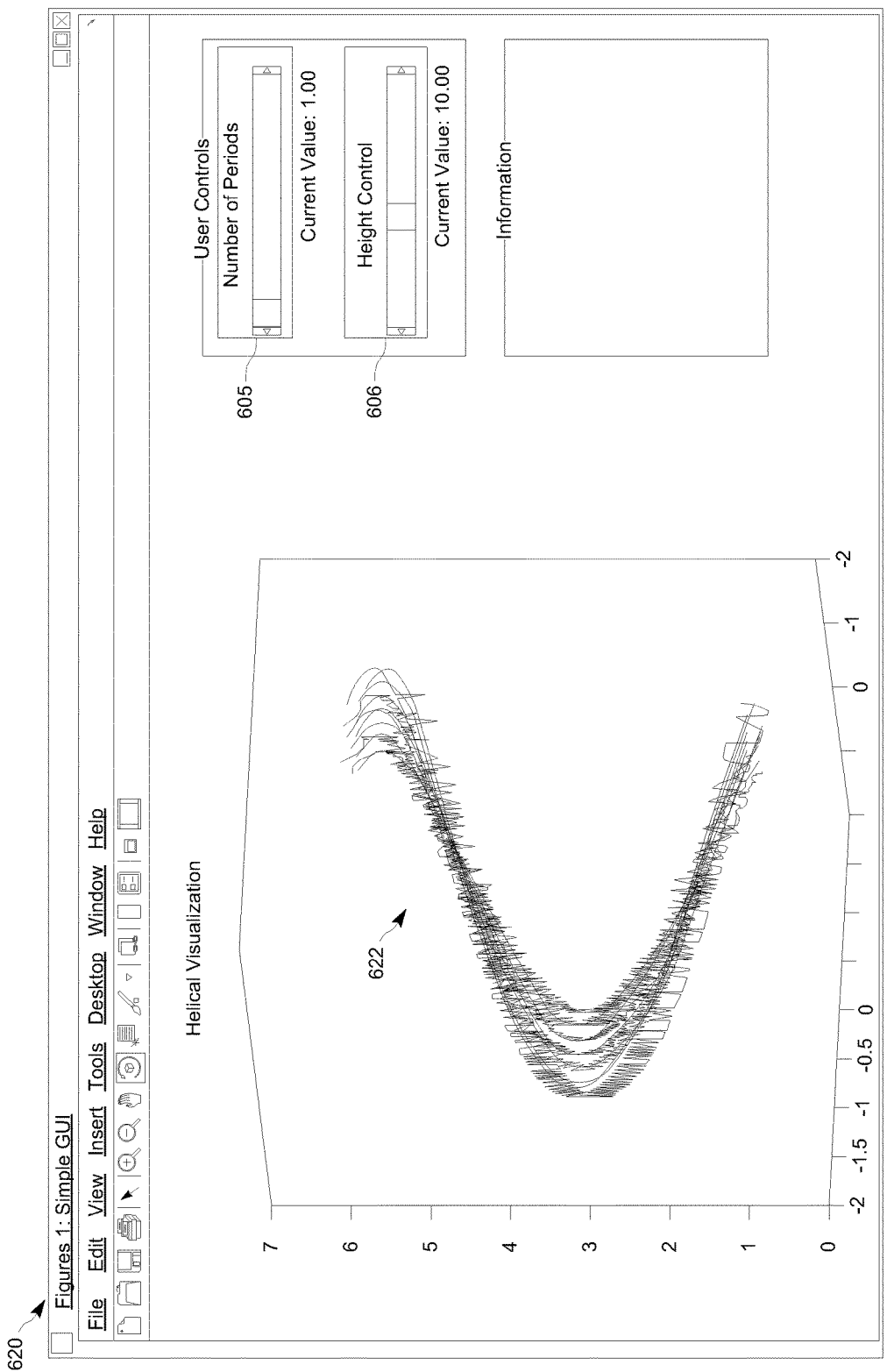
FIG. 12 illustrates a screenshot of the helical graphs of FIG. 11 at a second scale.
Figure 13:
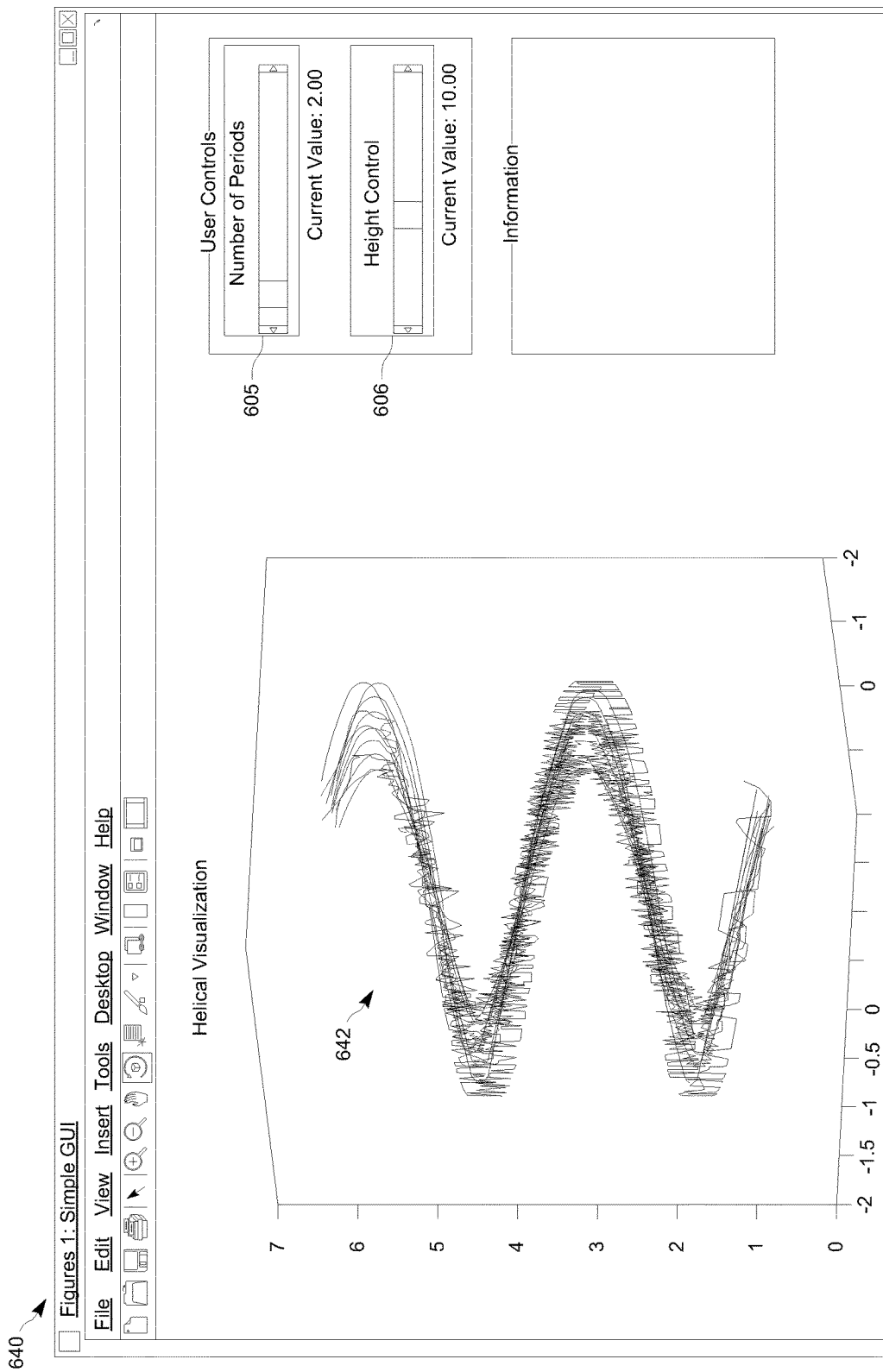
FIG. 13 illustrates a screenshot of the helical graph of FIG. 12 at a third scale.

FIG. 12 illustrates a screenshot 620 with a helical graph 622 where the periods are increased (e.g., with the period slider 605), and additional spacing is illustrated in the data. The helical graph 622 may represent the same data that is represented in the helical graphs 602 and 604, combined, and with a different scale. FIG. 13 illustrates a screenshot 640 with a helical graph 642 where the periods are further increased (e.g., using the period slider 605). Similar to the helical graph 622 in FIG. 12, the helical graph 642 may represent the same data that is represented with the helical graphs 602 and 604, combined and with a different scale.

Figure 14:
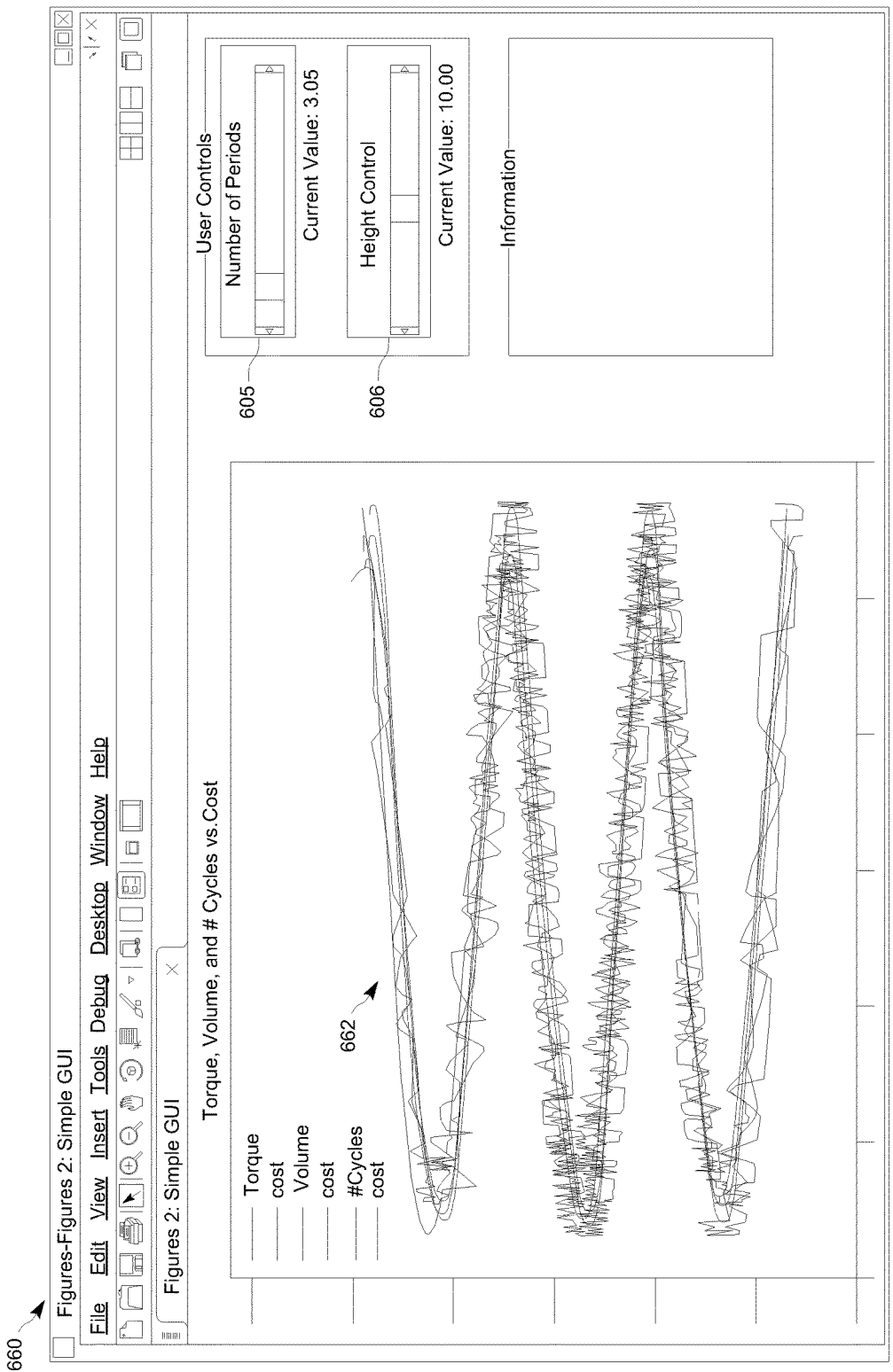
FIG. 14 illustrates a screenshot of a subset of the helical graphs of FIG. 12.

FIG. 14 illustrates a screenshot 662 with a helical graph 662 that shows a subset (three) of parameters plotted in the helical graphs 622 and 642 (and a subset of the combination of the helical graphs 602 and 604). Moreover, the helical graph 662 depicts data points that fall within user-defined criteria range(s). In the helical graph 662, as one example, design parameters of a notional (hypothetical) engine (e.g., a combustion engine; dependent variable) are plotted as a function of a notional cost data (the universal/independent variable) operating as the H-axis. The helical graph 662 could represent, for instance, a direct cost comparison of a 2 cycle engine vs a 4 cycle engine. In this situation, the rings of data could allow a viewer of the GUI 220 to view disparate groups of data on one chart (or several charts), wherein all available data (or a subset thereof) is output with minimal (or no) data "massaging" as would often be implemented in a Cartesian data set. It is noted that throughout this disclosure, the examples of helical graphs described and illustrated do not necessarily represent physically measured or observed data. Rather, the examples of helical graphs are provided to facilitate understanding of the helical graphs.

Figure 15:
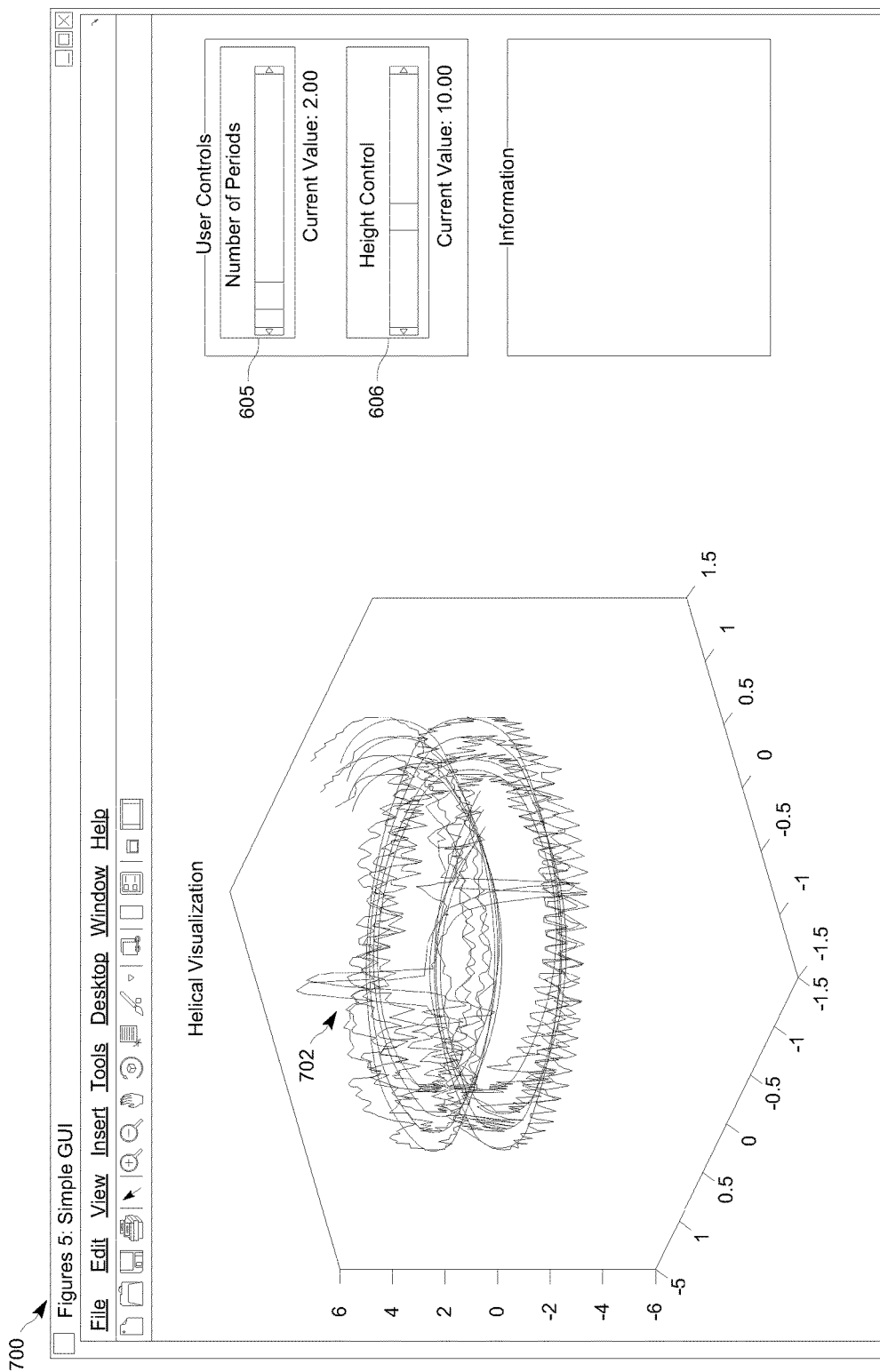
FIG. 15 illustrates another screenshot of a helical graph.
Figure 16:
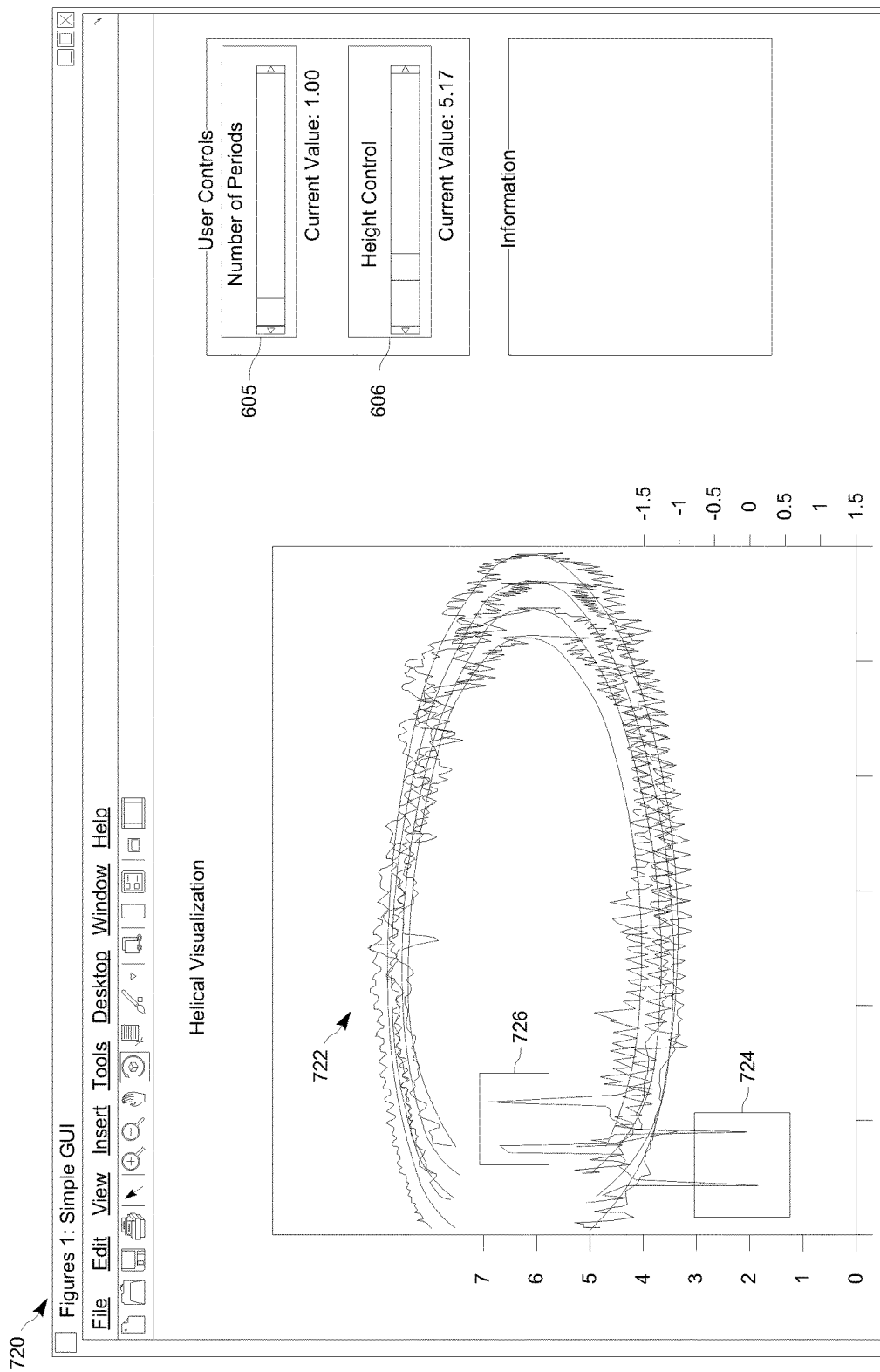
FIG. 16 illustrates a screenshot of the helical graph of FIG. 15 at a second scale.
Figure 17:
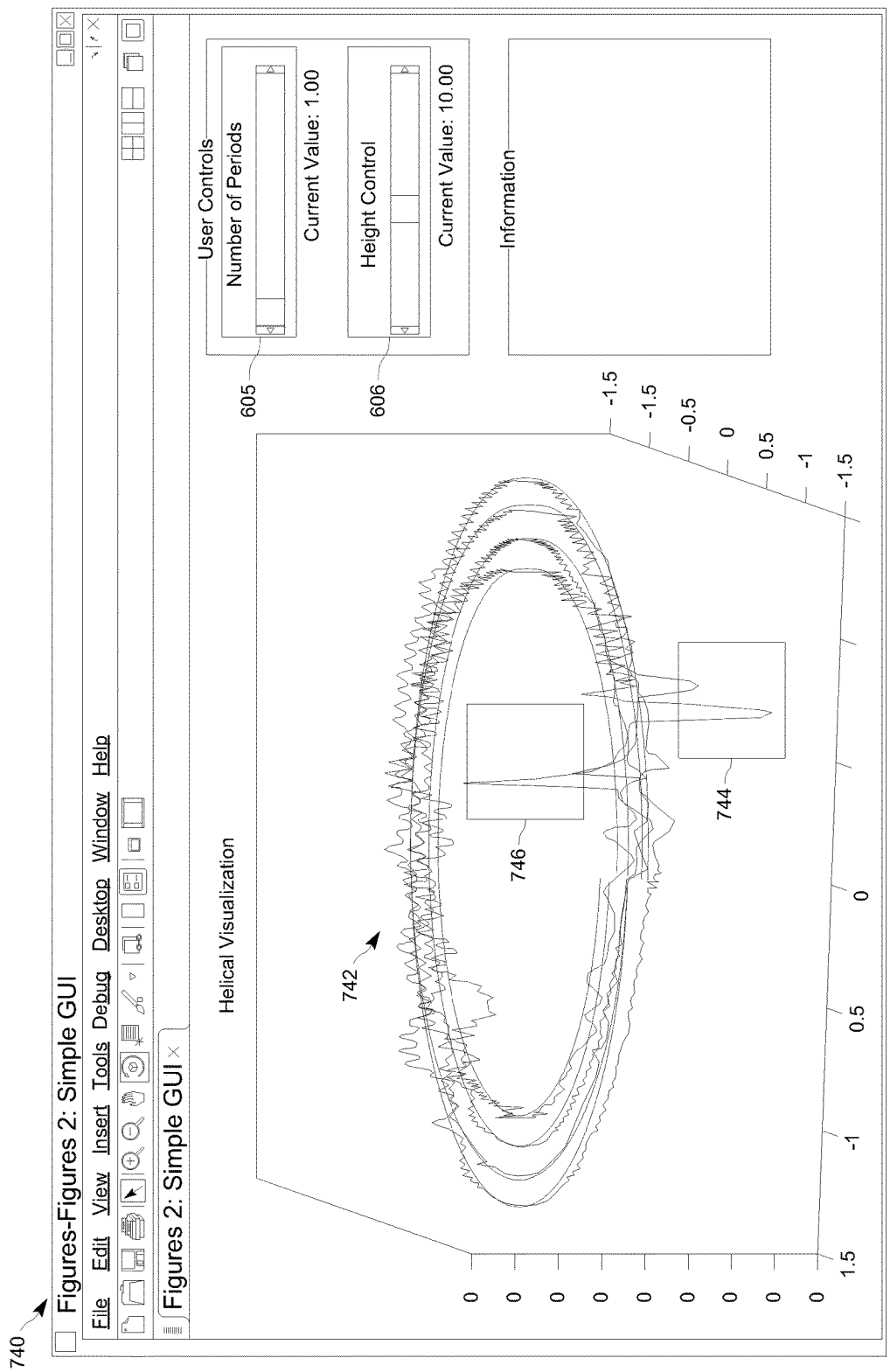
FIG. 17 illustrates a screenshot of the helical graph of FIG. 16 at a third scale.

FIGS. 15-22 illustrate another example of screenshots that could be provided by the GUI 22 depicting helical graphs that represent another instance of a group of helical data sets (e.g., the N number of helical data sets 218). Specifically, FIG. 15 illustrates a screenshot 700 that depicts a helical graph 702 that plots data (such as raw data) that has been normalized (e.g., by the HHT 216). FIG. 16 illustrates a screenshot 720 depicting a helical graph 722 where the helical data has not been normalized. The helical graph 722 includes outliers noted in boxes 724 and 726. FIG. 17 illustrates a screenshot 740 depicting a helical graph 742 where the helical data has been normalized for one period. The helical graph 742 appears similar to the helical graph 722 (non-normalized helical data) due to the presence of outliers (such as those within the boxes 744 and 746) and relative correlations emerge through visual inspection of the helical graph 742.

Figure 18:
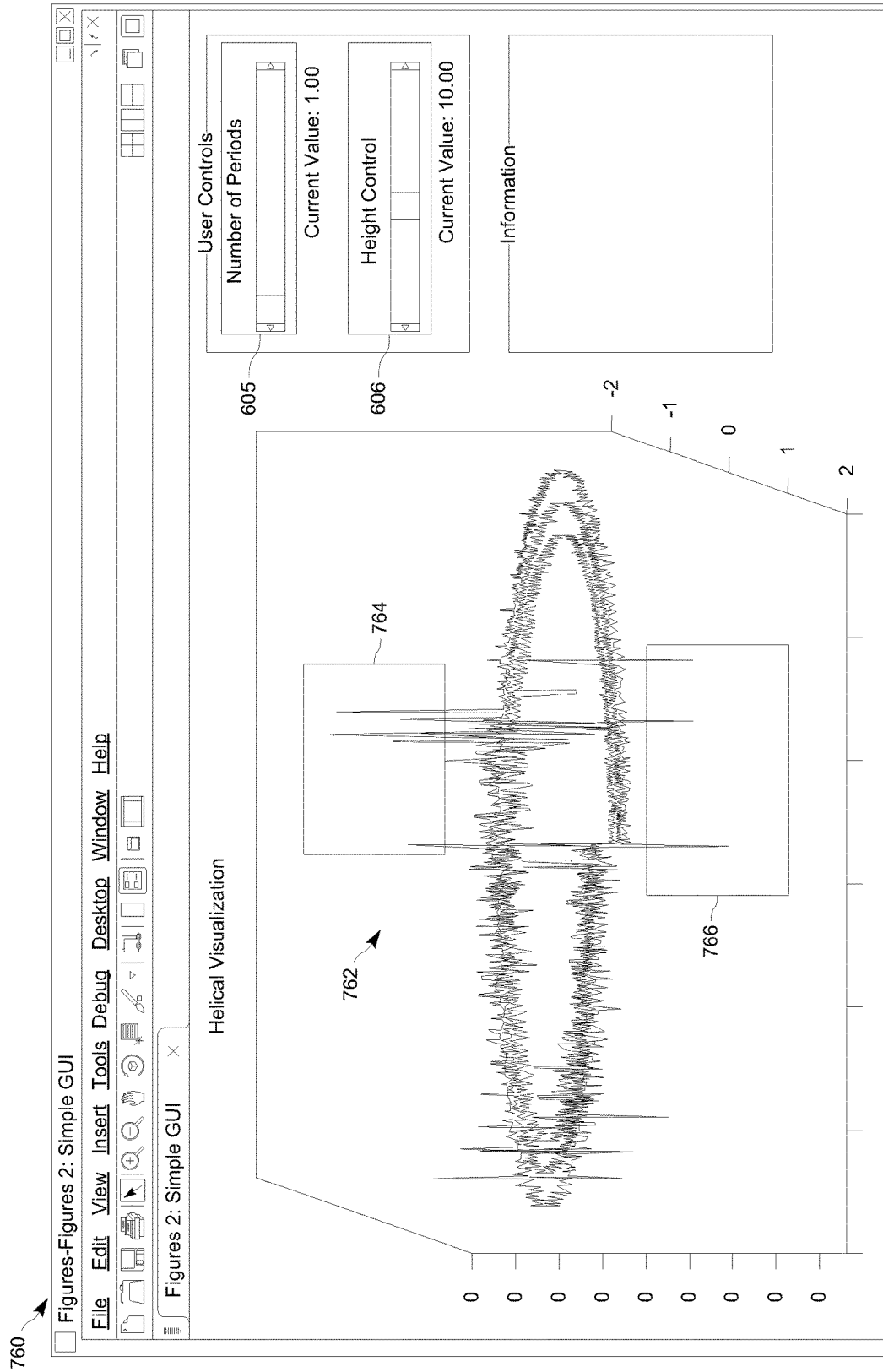
FIG. 18 illustrates a screenshot of the helical graph of FIG. 17 rotated.
Figure 19:
FIG. 19 illustrates a screenshot of the helical graph of FIG. 16 at a fourth scale.
Figure 20:
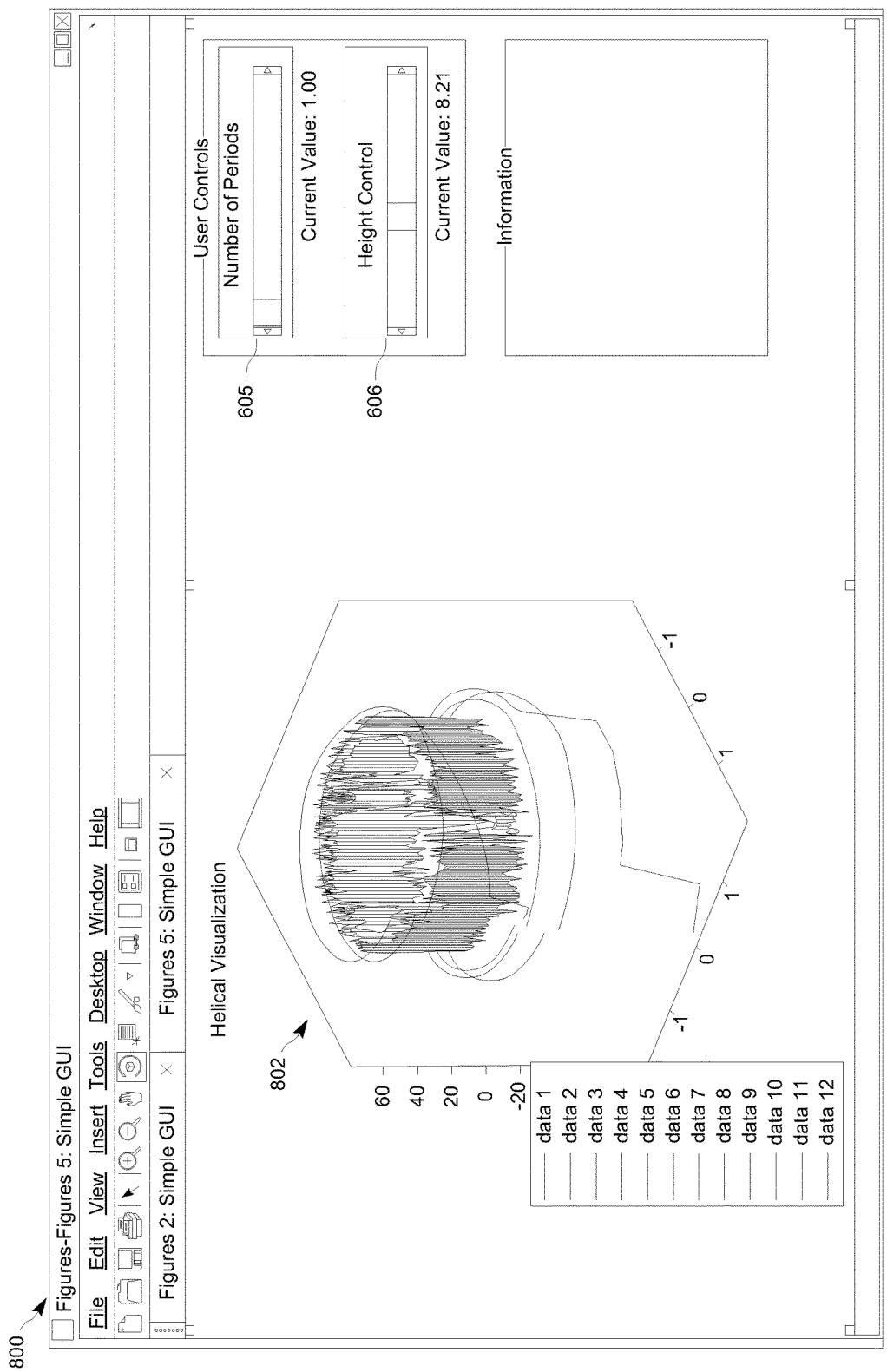
FIG. 20 illustrates a screenshot of the helical graph of FIG. 16 at a fifth scale.
Figure 21:
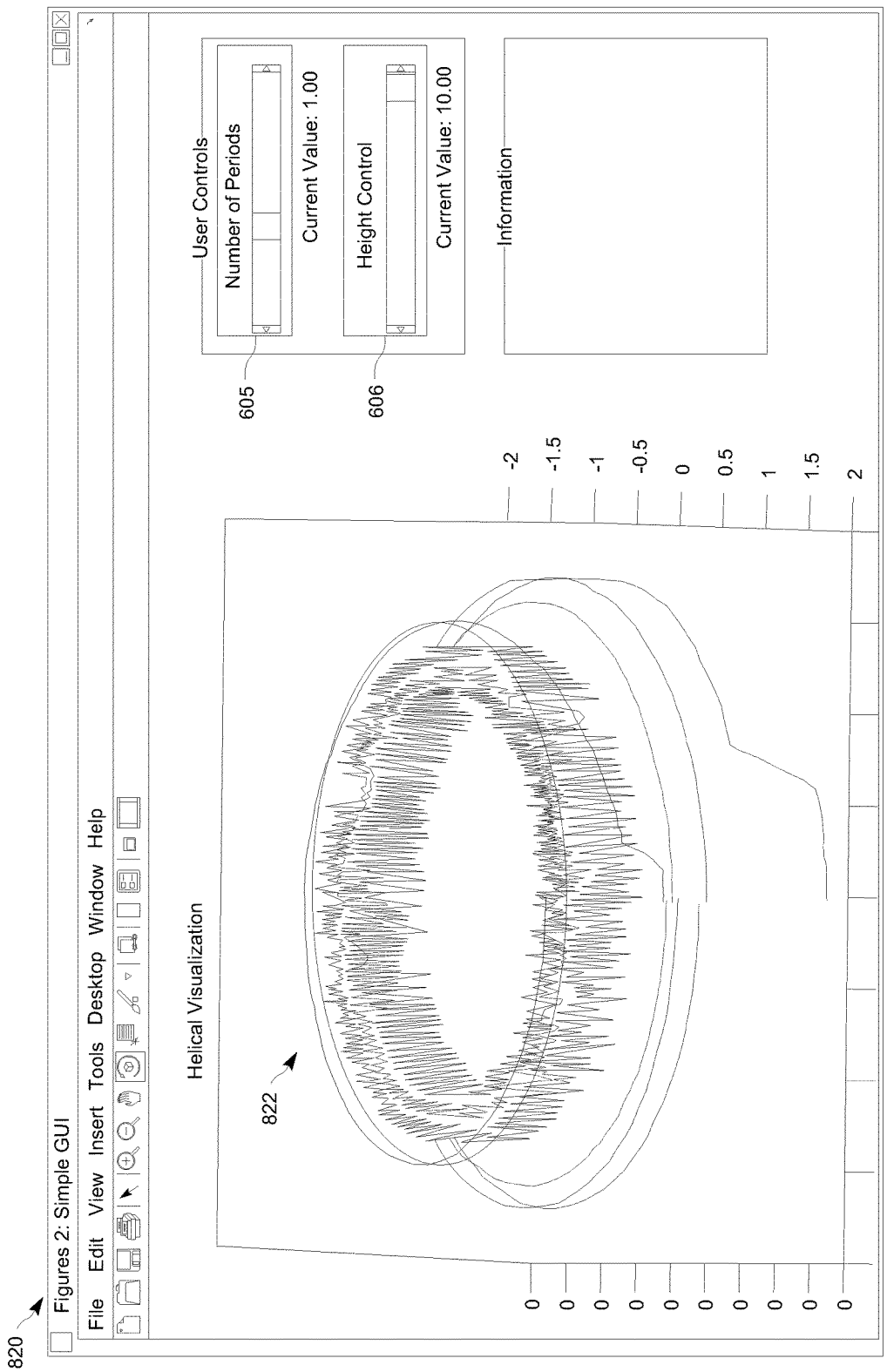
FIG. 21 illustrates a screenshot of the helical graph of FIG. 16 at a sixth scale.
Figure 22:
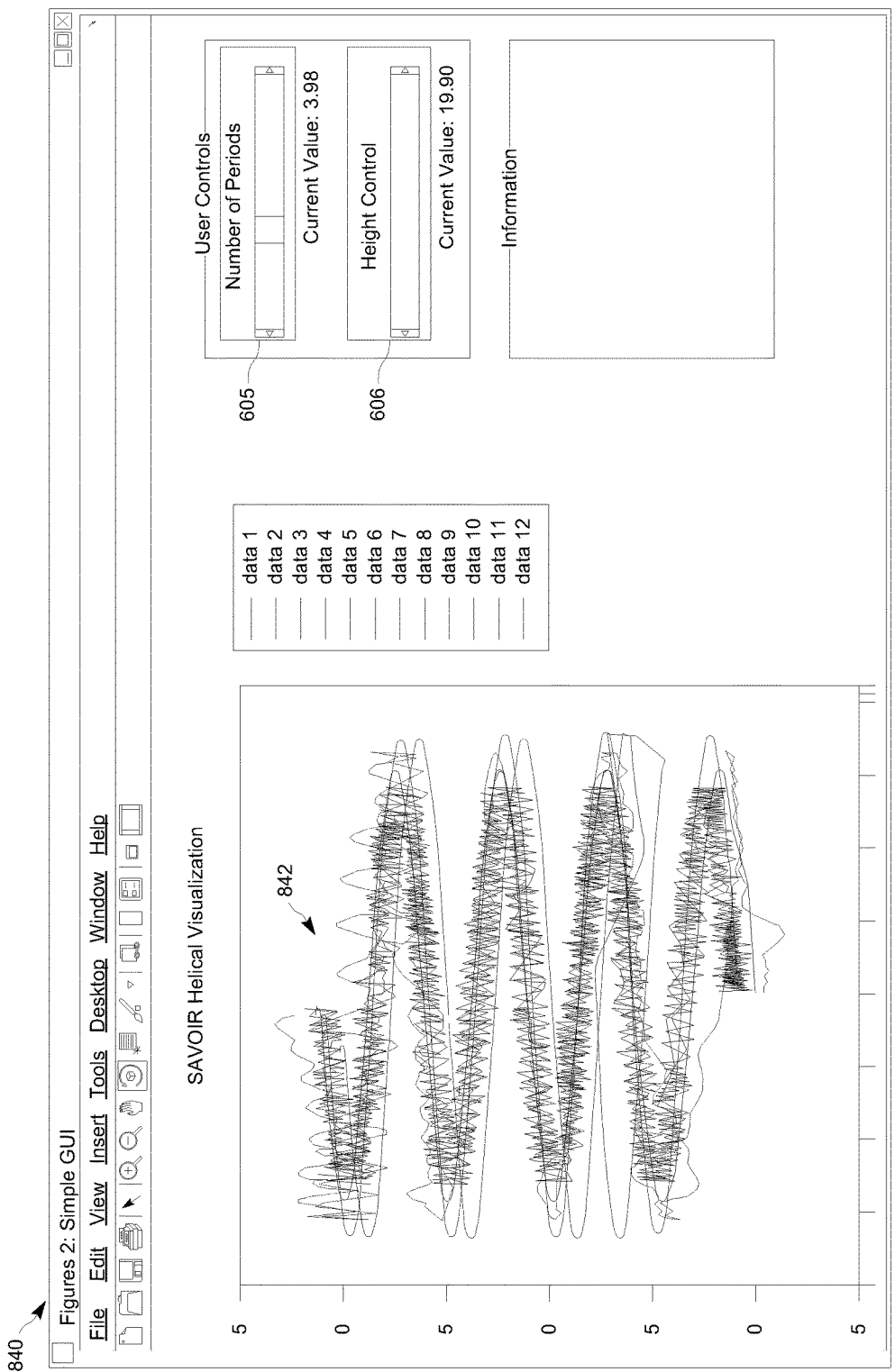
FIG. 22 illustrates a screenshot of the helical graph of FIG. 16 at a seventh scale.

FIG. 18 illustrates a screenshot 760 depicting a helical graph 762 that has been rotated and scaled relative to the helical graph 742 through manipulation of controls provided by the GUI 220. As illustrated by the helical graph 760, outliers, such as outliers within boxes 764 and 766 are readily identifiable through visual inspection. FIG. 19 illustrates a screenshot 780 depicting a helical graph 782 with a "side view", scaled to a period of 2.00 with the period slider 605 that gives an overview of voluminous test data. FIG. 20 illustrates a screenshot 800 depicting a helical graph 802 with a decreased height (decreased with the height slider 606) and a decreased number of periods (decreased with the period slider 605) relative to the helical graph 782. FIG. 21 illustrates a screenshot 820 depicting a helical graph 822 with an increase in the height (increased by the height slider 606) of the helixes relative to the helical graph 802. FIG. 22 illustrates a screenshot 840 depicting a helical graph 842 with a further increase in height (increased with the height control 606) and a further increase in the number of periods (increased with the period slider 605) relative to the helical graph 822. As illustrated by the helical graph 842, increases in the number of periods and height displayed (relative to the helical graph 822) causes an increase of spacing between data points to identify obfuscated patterns.

Referring back to FIG. 4, by employment of the computing device 200, numerous input parameters representing the N number of Cartesian data sets 214 can be converted to the N number of helical data sets 218 that can be employed to generate and output (by the GUI 220) helical graphs. As illustrated by the helical graphs depicted in FIGS. 5-22, specific forms of a helix (scaled) allow temporal correlations to be visualized with ease. Additionally, the GUI 220 can include features for executing statistical analysis on the N number of data sets 218 and outputting the results graphically and/or numerically.

Figure 23:
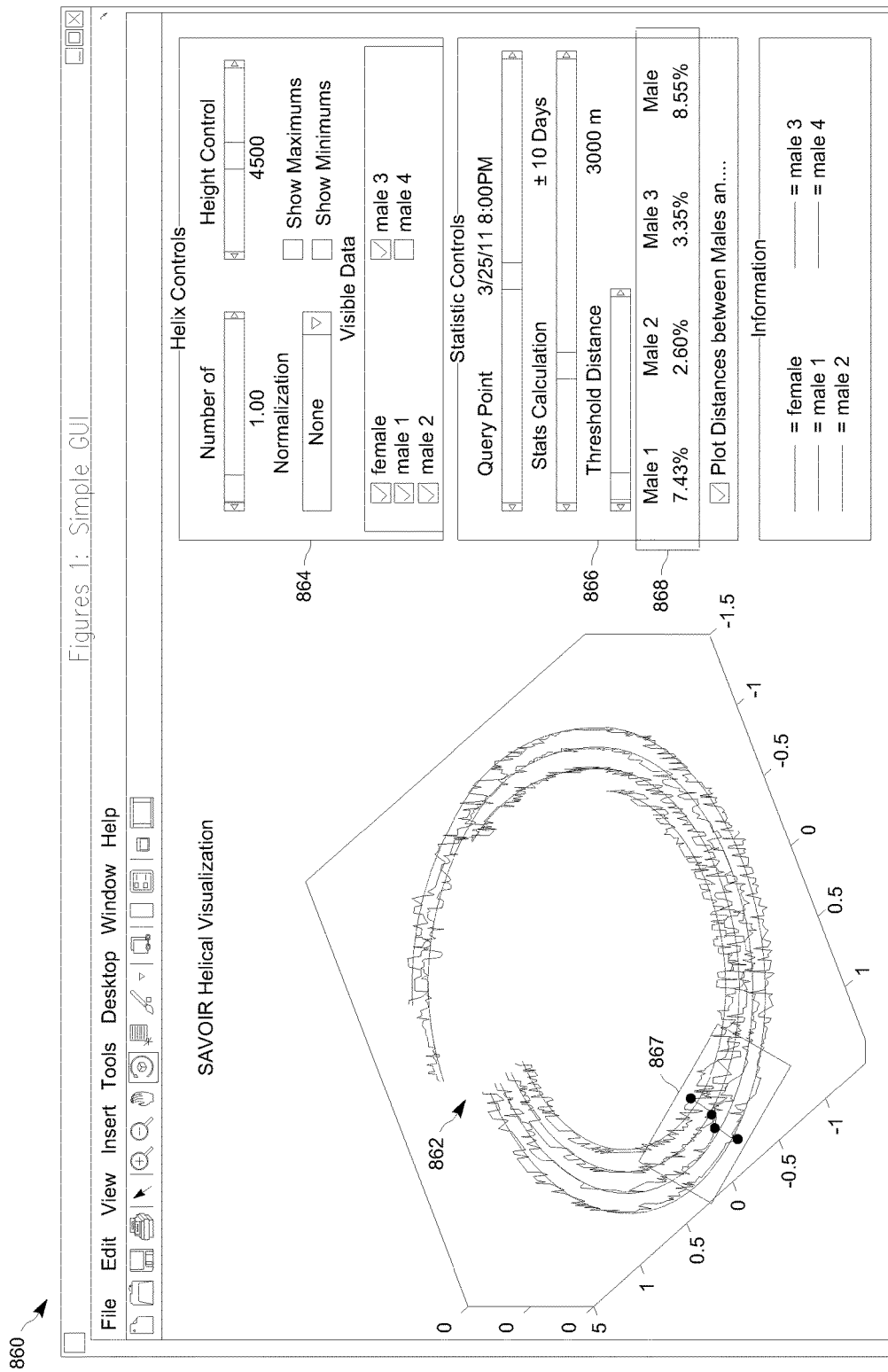
FIG. 23 illustrates a screenshot of a helical graph employed for statistical analysis.

FIG. 23 illustrates yet another example of a screenshot 860 that could be provided by the GUI 22 depicting helical graphs 862 that represent another instance of a group of helical data sets (e.g., the N number of helical data sets 218). The screenshot 860 could be employed, for example, to assist with statistical analysis of the data sets. The helical graphs 862 plots normalized data. The screenshot 860 includes helix controls 864 (user controls) for controlling a shape, such as the normalization, height and variables output by the helical graph 862.

The screenshot 860 also includes statistical controls 866 that allow a user to perform statistical analysis on the data represented by the helical graph 862. In the example illustrated in the screenshot 860, the statistical controls 866 can provide controls for varying a query point, a statistical calculation range and a threshold distance. However, in other examples, other user controls can be provided in the statistical controls 866. The helical graph 862 can include a section 867 that highlights data identified in the statistical controls 866. Moreover, the statistical controls 866 can include a data output region 866 that outputs statistical values (statistics) derived from statistical analysis executed in response to settings in the statistical controls. As illustrated in FIG. 23, statistical results and other structural analytics results can be viewed alongside the original datasets or helix structures.

Furthermore, referring back to FIG. 4, the helical engine 212 can include a model generator 222 that can generate a physical model file 224. The physical model file 224 can represent a (virtual) physical three-dimensional (3D) model of the helical graphs depicted by the N number of helical data sets 218 (such as the helical graphs illustrated in FIGS. 5-22). The model generator 222 could also be referred to as a Helical History Fly-thru Tool (HHFT). It is noted that although the model generator 222 is described as being a component of the helical engine 212, in other examples, the model generator 222 may be a constituent component of another module or as a stand-alone module.

For instance, to generate the physical model file 224, the model generator 222 can analyze the N number of helical data sets 218 (or some subset thereof) and add sufficient dimension (e.g., about 1 millimeter or more) to each line such that the helical plot can be characterized as a distorted coil (a helix). It is noted that in some examples, the physical model file 224 could be employed to generate a 3D printout (e.g., a physical instantiation) of a helical graph. For instance, the physical model file 224 can be a stereolithography (.STL) formatted file (or other format) that can be employed by a 3D printer to print a physical model of a helical graph.

Additionally, the memory 202 can include a structural analysis application 226 (e.g., a simulator) that can access the physical model file 224 and execute a structural analysis on a (virtual) physical model characterized in the physical model file 224 to reveal additional/alternative information regarding the N number of helical data sets 218 or some subset thereof.

Figure 24:
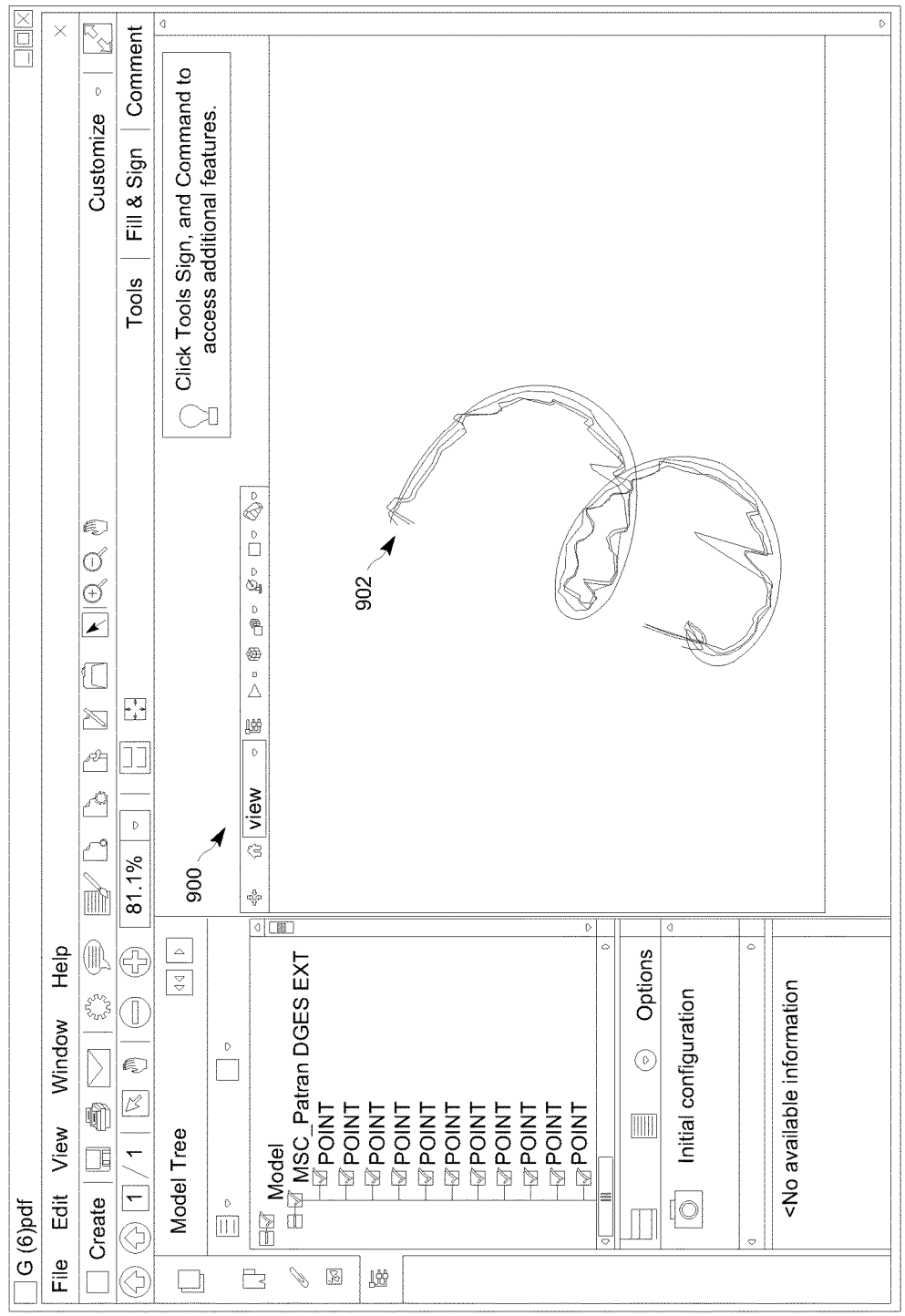
FIG. 24 illustrates an example of a physical model of a helical graph.
Figure 25:
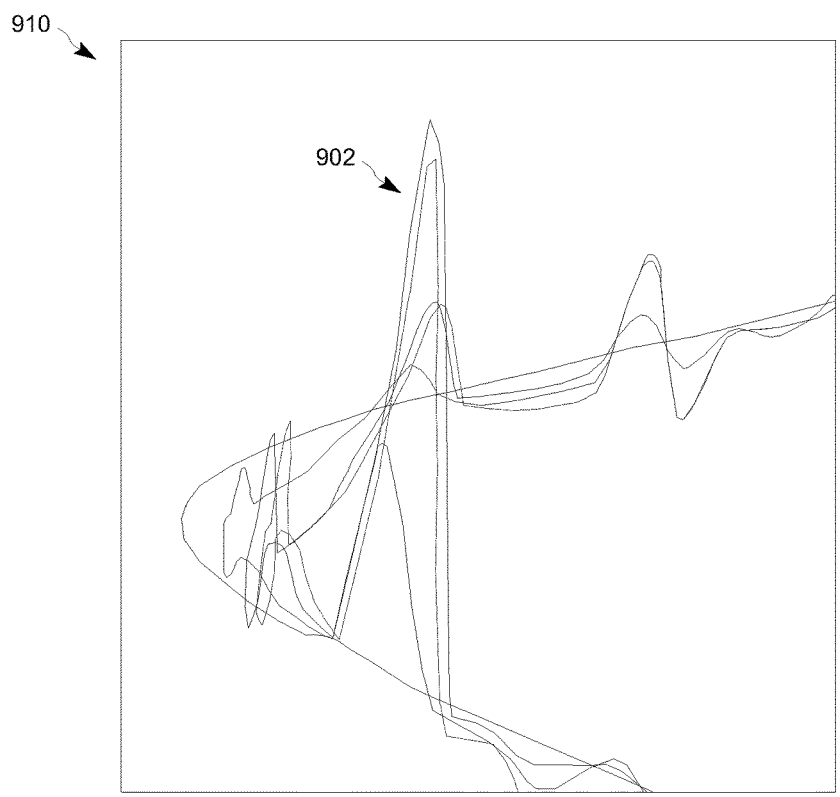
FIG. 25 illustrates an example of a portion the physical model of the helical graph in FIG. 24 in an expanded view.
Figure 26:
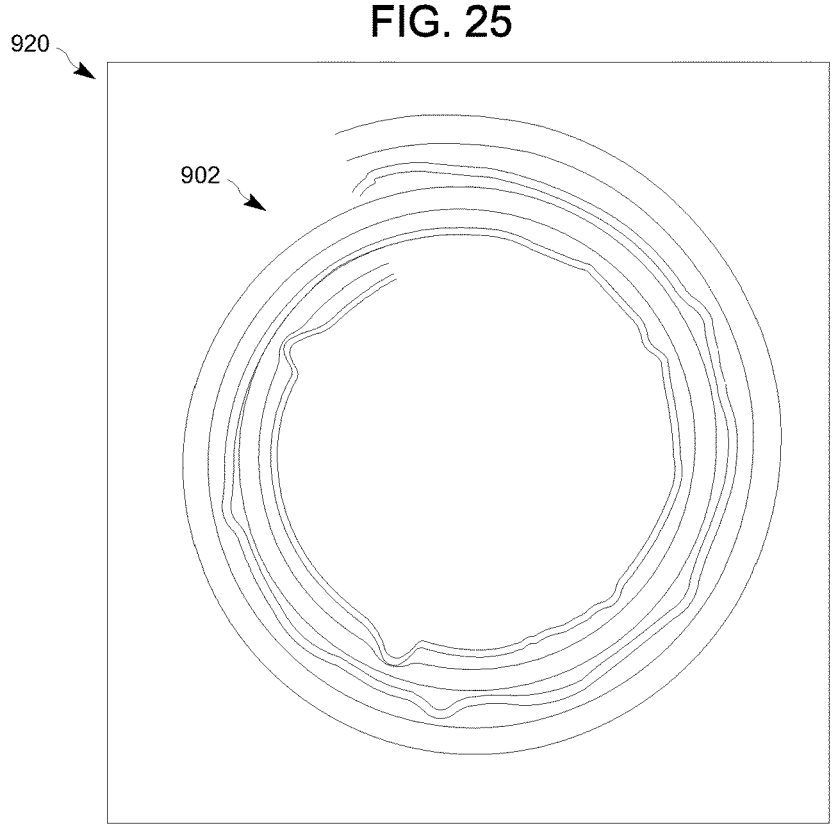
FIG. 26 illustrates an example of the physical model of the helical graph in FIG. 24 in another view.

The structural analysis application 226 can be implemented as a software application such as SCIA Engineer™, VisualAnalysis™, etc. FIG. 24 depicts an example of a screenshot 900 that can be generated by the structural analysis application 226 (e.g., via the GUI 220) that plots a 3D view of a helical graph 902. As is illustrated, the helical graph 902 can be represented as solid wires. FIG. 25 represents a zoomed-in (expanded) view 910 of the helical graph 902. FIG. 26 represents a top (overhead) view 920 of the helical graph 902. This structure can be referred to as a 3D helical graph and/or as a helical structure.

Referring back to FIG. 4, the structural analysis application 226 can impose a simplicity of an object onto multifaceted data parameters to improve methods for extracting and interpreting non-obvious data relationships in near-real-time from the virtual physical object characterized in the physical model file 224. Accordingly, analytics can be performed on the various parameters using perturbations inside structural analysis tools. For instance, climate monitoring, forecast modeling, temporal analysis, environmental decision support and/or environmental unrest are difficult to embrace, understand and analyze due to hidden relationships in the data and the overall complexity of the analysis. The structural analysis application 226 can analyze the physical model characterized in the physical model file 224 to provide clarity and strategic insight to extract intelligence and identify immediate action that can be determined from timely observation of expected and unexpected correlations. For instance, by employing structural analysis tools of the structural analysis application 226 to depict the base structure of a 3D representation of a helical graph (e.g., the helical graph 902 of FIGS. 24-26) with the data defining parameters, both mathematical analysis and visualization are achievable.

For example, the structural analysis application 226 can include, but is not limited to tools to implement finite element analysis, application of heat, stress, tension and other statics on the physical model characterized in the physical model file 224 to further reveal anomalies and outliers in volumes of data. The structural analysis application 226 can cooperate with the GUI 220 to provide user controls to set parameters that define boundaries of the 3D helical graph characterized in the physical model file 224.

Moreover, in some examples, intelligent labels can be applied by the structural analysis application 226 (via the GUI 220) to allow a following of an orientation of the 3D helical graph in real-time such that the user of the GUI 220 can view the 3D helical graph from any angle and read the connotations. In this manner, the user can employ the GUI to virtually "fly through" the graph structure. Additionally or alternatively, the graph structure can be viewed in a Virtual Immersive Portable Environment (VIPE) Holodeck or in a submersive reality cabin such that the viewer can walk into, view and manipulate the data characterized in the 3D helical graph in real-time.

Further, the helical engine 212 can also include a helix plotter 228. In the example illustrated in FIG. 4, it is presumed that the helix plotter 228 is an element of the helical engine 212. However, in other examples, the helix plotter 228 may be a stand-alone component and/or a constituent component of another software module. The helix plotter 228 can also be referred to as a Helical History Geo-located Tool (HHGT). The helix plotter 228 can generate a multi-helix structure file 230 from a plurality of different instances of the physical model file 224. In some examples, the multi-helix structure file 230 may also be a stereolithography (.STL) formatted file (or other format) that can be employed by a 3D printer to print a physical model of a helical graph. For example, the helix plotter 228 can position different instances of a (virtual) physical helix (characterized by each physical model file 224) onto a (virtual) multi-faceted 3D base structure, such as a geoid, a polyhedron, a slab or a topological map to generate the multi-helix structure file 230. The multi-helix structure file 230 can be analyzed and output as a multi-helix structure via the GUI 220 by the structural analysis application 226.

Figure 27:
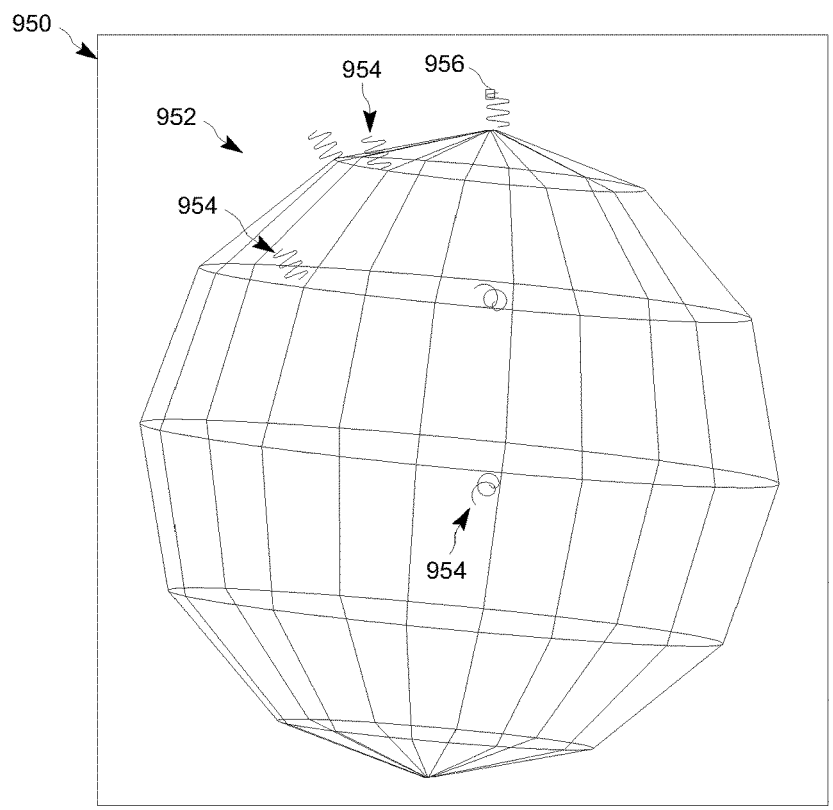
FIG. 27 illustrates an example of a physical model of a multi-helix structure.
Figure 28:
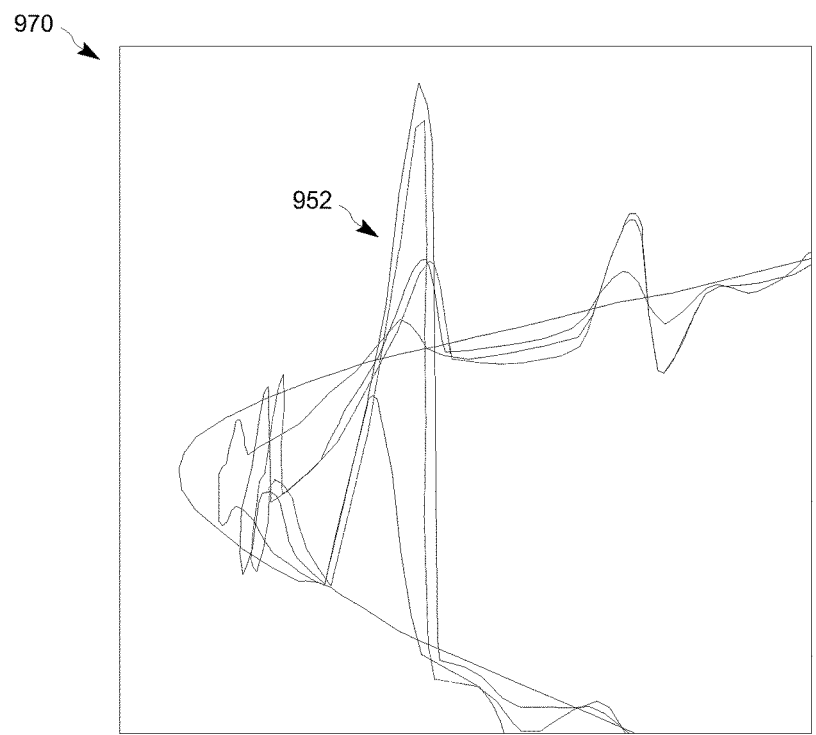
FIG. 28 illustrates an example of a portion of the physical model of the multi-helix structure of FIG. 27 in an expanded view.
Figure 29:
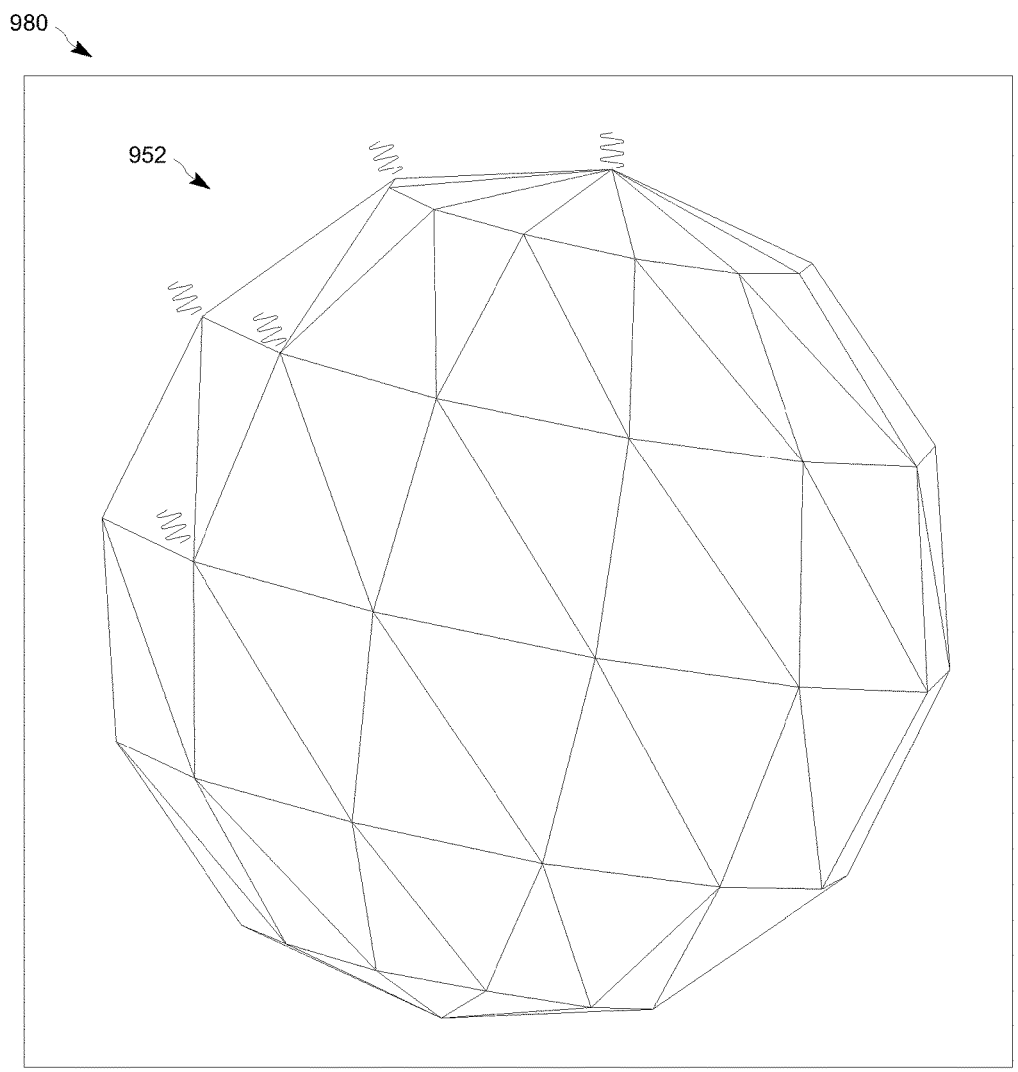
FIG. 29 illustrates an example of a physical model of a multi-helix structure with a solid structure.

FIG. 27 depicts a screenshot 950 that can be generated by the structural analysis application 226 depicting an example of a geoid 952 (a multi-faceted base structure) represented by the multi-helix structure file 230 with helixes 954 positioned on different locations of the geoid 952. In one example, each helix 954 on the geoid 952 could represent temperature plotted as a function of time and a position of each helix 954 can represent a position of the earth (in latitude and longitudinal coordinates) that a measurement was taken. The screenshot 950 includes a boundary 956 that corresponds to a screenshot 970 that is a zoomed-in (expanded) view of the geoid 952 depicted in FIG. 28. Additionally, FIG. 29 depicts a screenshot 980 with the geoid 952 represented as a solid structure. Referring back to FIG. 4, the structural analysis application 226 can be employed, for example, to link data in three dimensions to evaluate patterns and correlate data with built-in structural analysis functions.

Thus, by employment of the computing device 200, a user of the GUI 220 can be provided with a simple, yet efficient mechanism for viewing a characterization of a "big data" set. As described herein, the HHT 216, the model generator 222 and/or the helix plotter 228 can be employed by a user (via the GUI 220) to view the "big data" sets in a concise display to reduce or eliminate crowded or multiple Cartesian (X-Y) graphs. The GUI 220 provides controls allowing for twisting, shaping and manipulation of views of the helical graph characterizing the N number of helical data sets 218 (or some subset thereof) until obvious patterns and correlations emerge to a viewer.

Further, the displayed helical graphs (or spirals) prevents valuable data from being overlooked and can turn highly complex disparate informational data sets into intuitive obvious results and conclusions. The helical graphs displayed enable predictive analytics by foreshadowing trends in any data set and can restore an intuitive pictorial representation of periodic mathematical analyses such as Fast Fourier Transforms (FFTs). The helical graphs can simplify complex data results such that an individual (e.g., a "decision maker") who relies on "big data" sets for decision making (and may not be specifically trained in the particular science of a specific data set) are able to understand the implications of the data. For instance, the individual can view the data (via the helical graph) and make such decisions, choices and direct focus in parallel or in near-real time as data collection (for the "big data" set) without waiting for formal and time consuming analysis to make decisions.

Figure 30:
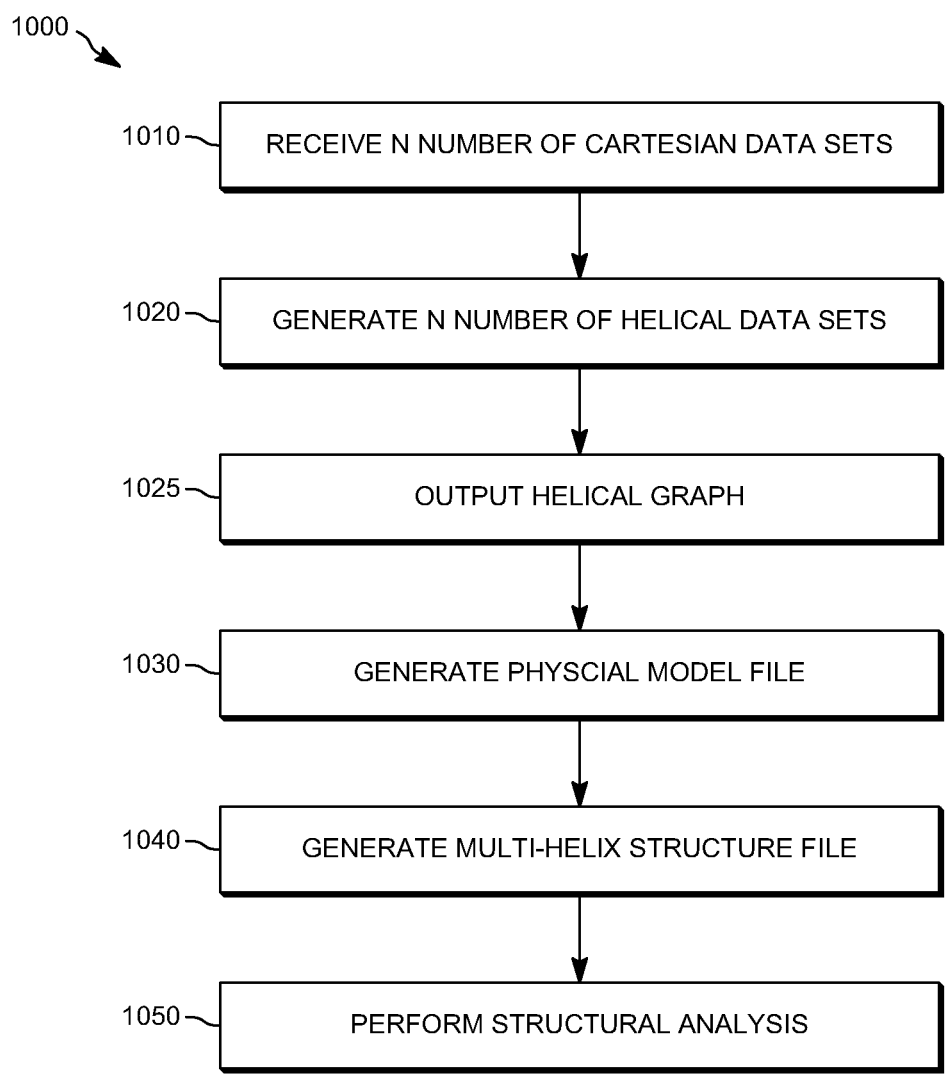
FIG. 30 illustrates a flowchart of an example method for generating and analyzing a helical graph.

In view of the foregoing structural and functional features described above, an example method will be better appreciated with reference to FIG. 30. While, for purposes of simplicity of explanation, the example method of FIG. 30 is shown and described as executing both serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 30 illustrates a flowchart of an example method 1000 for generating and analyzing a helical graph. The method 1000 can be implemented, for example by the computing device 200 of FIG. 4 and/or the system 50 of FIG. 1. At 1010, N number of Cartesian data sets can be received at a helical engine (e.g., the helical engine 212 of FIG. 4). At 1020, the helical engine can convert the N number of Cartesian data sets into a corresponding N number of helical data sets. At 1025 a helical graph characterizing the helical data sets (or some subset thereof) can be output by GUI (e.g., the GUI 220 of FIG. 4). At 1030, the helical engine can generate a physical model file based on the N number of helical data sets (or some subset thereof). At 1040, the helical engine can generate a multi-helix structure file that includes a plurality of helices positioned on a 3D structure. Now, even statistical results and other structural analytics results can be viewed alongside the original datasets or helix structures. At 1050, a structural analysis application (e.g., the structural analysis application 226 of FIG. 4) can perform structural analysis on the physical model file and/or the multi-helix structure file.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine executable instructions, the machine executable instructions comprising:
    a helical engine that converts a Cartesian data set that characterizes a Cartesian graph into a helical data set that characterizes a helical graph, wherein the helical graph comprises:

a helical shaped axis defining a given variable and a magnitude of deviations in a direction that is vertical and perpendicular to the helical shaped axis that represent another variable of the Cartesian data set, wherein the magnitude of deviation from the helical shaped axis corresponds to a deviation from a mean value of the other variable in the Cartesian data set.

2. The medium of claim 1, wherein each turn in the helical shaped axis defines a period of the other variable.

3. The medium of claim 1, wherein a radius of each turn in the helical shaped axis is set by a predefined parameter.

4. The medium of claim 1, further comprising a graphical user interface (GUI) that outputs a graphical representation of the helical graph.

5. The medium of claim 4, wherein the GUI provides user controls for changing a scale of the helical graph.

6. The medium of claim 5, wherein the user controls comprises a control for changing a height of the helical graph output by the GUI.

7. The medium of claim 5, wherein the user controls comprises a control for changing a number of periods in the helical graph output by the GUI.

8. The medium of claim 1, wherein the helical engine comprises a model generator that generates a file characterizing a physical instantiation of the helical graph.

9. The medium of claim 8, wherein the helical engine further comprises a helix plotter that generates a multi-helix structure file that includes data characterizing the physical instantiation of the helical graph positioned on a multi-faceted three dimensional structure.

10. The medium of claim 9, wherein the multi-faceted three dimensional structure comprises a geoid.

11. A system comprising:
a memory that stores machine readable instructions; and
a processing unit that accesses the memory and executes the machine readable instructions, the machine readable instructions comprising:
a helical engine that receives a plurality of Cartesian data sets that each characterize a Cartesian graph with a given variable and another variable, the helical engine comprising:
a helical history tool (HHT) that converts each of the plurality of Cartesian data sets into a corresponding one of a plurality of helical data sets, wherein each helical data set characterizes a helical shaped axis that represent the given variable of the corresponding Cartesian data set and a magnitude of deviations in a direction that is vertical and perpendicular to the helical shaped axis that represent the other variable of the corresponding Cartesian data set, wherein the magnitude of deviation from the helical shaped axis corresponds to a deviation from a mean value of the other variable in the corresponding Cartesian data set; and
a graphical user interface (GUI) that outputs a helical graph that represents each of the plurality of helical data sets.

12. The system of claim 11, wherein the helical engine further comprises a model generator that converts each of the plurality of helical data sets into a corresponding one of a plurality of physical model files that each characterizes a physical instantiation of a respective helical graph.

13. The system of claim 12, wherein the helical engine further comprises a helix plotter that generates a multi-helix structure file based on each of the plurality of physical model files, wherein the multi-helix structure file characterizes a multi-faceted three dimensional structure with helices characterized by the plurality of physical model files positioned on the surface of the multi-faceted three dimensional structure.

14. The system of claim 11, wherein the GUI provides user controls that allow for a change in scale of the helical graph.

15. The system of claim 11, wherein the GUI provides user controls for rotating the helical graph.

16. The system of claim 11, wherein the GUI provides user controls for executing statistical analysis on data represented by the helical graph and the GUI outputs data characterizing statistics derived from the statistical analysis.

17. A method comprising:
converting, by a computing device, a Cartesian data set into a helical data set, wherein the helical graph comprises a helical shaped axis defining a given variable and a magnitude of deviations in a direction that is vertical and perpendicular to from the helical shaped axis that represent another variable of the Cartesian data set, wherein the magnitude of deviation from the helical shaped axis corresponds to a deviation from a mean value of the other variable in the Cartesian data set; and
generating, by the computing device, a physical model file that characterizes a physical instantiation of the helical graph.

18. The method of claim 17, further comprising:
performing, by the computing device, a structural analysis on the helical graph characterized in the physical model file.

* * * * *